US012792175B2

(12) United States Patent
So et al.

(10) Patent No.: US 12,792,175 B2
(45) Date of Patent: Nov. 10, 2026

(54) TOUCH DETECTION MODULE AND DISPLAY DEVICE INCLUDING THE SAME

(71) Applicant: Samsung Display Co., LTD., Yongin-si (KR)

(72) Inventors: Yong Sub So, Yongin-si (KR); Sang Hun Park, Yongin-si (KR); Young Min Park, Yongin-si (KR); Bo Hwan Lee, Yongin-si (KR); Ho Eung Lee, Yongin-si (KR); Byeong Kyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/955,781

(22) Filed: Nov. 21, 2024

(65) Prior Publication Data

US 2025/0284360 A1 Sep. 11, 2025

(30) Foreign Application Priority Data

Mar. 5, 2024 (KR) ........................ 10-2024-0031338

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05)

(58) Field of Classification Search
CPC ........................... G06F 3/04164; G06F 3/0446
USPC .......................................................... 345/173
See application file for complete search history.

(56) References Cited

U.S. PATENT DOCUMENTS

| | | | | |
|---|---|---|---|---|
| 9,001,080 | B2 | 4/2015 | Okayama et al. | |
| 9,354,264 | B2 * | 5/2016 | Schwartz | G01R 27/2605 |
| 2014/0152621 | A1 * | 6/2014 | Okayama | G06F 3/04182 345/174 |
| 2017/0090622 | A1 * | 3/2017 | Badaye | G06F 3/0448 |
| 2019/0018523 | A1 * | 1/2019 | Xu | G06F 3/0443 |
| 2023/0065926 | A1 * | 3/2023 | Kuo | G06F 1/1652 |

FOREIGN PATENT DOCUMENTS

KR 10-2023-0092589 A 6/2023

* cited by examiner

*Primary Examiner* — Mark Edwards
(74) *Attorney, Agent, or Firm* — Womble Bond Dickinson (US) LLP

(57) ABSTRACT

A touch detection module includes: a touch sensing unit including: touch electrodes in a touch sensing area, the touch sensing area being divided into a plurality of divided areas; and touch driving signal lines and touch sensing signal lines in a touch peripheral area; and a touch driver circuit to: concurrently supply touch driving signals to the touch electrodes located in each of the divided areas through the touch driving signal lines; and detect touch sensing signals of the touch electrodes from each of the divided areas through the touch sensing signal lines. The touch driver circuit is to concurrently detect the touch sensing signals from the divided areas, and measure an amount of change in a capacitance of the touch electrodes.

18 Claims, 11 Drawing Sheets

TOUCH DETECTION MODULE AND DISPLAY DEVICE INCLUDING THE SAME

The present application claims priority to and the benefit of Korean Patent Application No. 10-2024-0031338, filed on Mar. 5, 2024, in the Korean Intellectual Property Office, the entire content of which is incorporated by reference herein.

BACKGROUND

1. Field

Aspects of embodiments of the present disclosure relate to a touch detection module, and a display device including the touch detection module.

2. Description of Related Art

As information-oriented society evolves, various demands for display devices are ever increasing. For example, display devices are being employed by a variety of electronic devices, such as smart phones, digital cameras, laptop computers, navigation devices, and smart televisions.

Display devices may be flat panel display devices, such as a liquid-crystal display device, a field emission display device, and an organic light-emitting display device. From among such flat panel display devices, a light-emitting display device includes a light-emitting element that can emit light on its own, so that each of the pixels of the display panel can emit light by themselves. Accordingly, a light-emitting display device may display images without using a backlight unit that supplies light to the display panel.

The above information disclosed in this Background section is for enhancement of understanding of the background of the present disclosure, and therefore, it may contain information that does not constitute prior art.

SUMMARY

Recently, a display device includes a touch detection module (e.g., a touch detector or a touch detection sensor) for sensing a user's touch as one of various interface means. The touch detection module includes a touch sensing unit (e.g., a touch sensor or a touch sensing layer) in which touch electrodes are arranged, and a touch driver circuit that detects a change in a capacitance between the touch electrodes. The touch detection module may be integrally formed on, or may be mounted on, a part of the display device where images are displayed.

One or more embodiments of the present disclosure may be directed to a touch detection module (e.g., a touch detector or a touch detection sensor) in which the size of the touch electrodes may be reduced, while the numbers of the touch electrodes and their channels may be increased to improve an accuracy of touch sensing. One or more embodiments of the present disclosure may be directed to a display device including the touch detection module.

One or more embodiments of the present disclosure may be directed to a touch detection module (e.g., a touch detector or a touch detection sensor) that may include increased numbers of touch electrodes and their channels, without increasing or substantially increasing the number of touch driver circuits. One or more embodiments of the present disclosure may be directed to a display device including the touch detection module.

However, the aspects and features of the present disclosure are not limited to those above, and the above and other aspects and features will be set forth, in part, in the description that follows, and in part, may be apparent from the description, or may be learned by practicing one or more of the presented embodiments of the present disclosure.

According to one or more embodiments of the present disclosure, a touch detection module includes: a touch sensing unit including: touch electrodes in a touch sensing area, the touch sensing area being divided into a plurality of divided areas; and touch driving signal lines and touch sensing signal lines in a touch peripheral area; and a touch driver circuit configured to: concurrently supply touch driving signals to the touch electrodes located in each of the divided areas through the touch driving signal lines; and detect touch sensing signals of the touch electrodes from each of the divided areas through the touch sensing signal lines. The touch driver circuit is configured to concurrently detect the touch sensing signals from the divided areas, and measure an amount of change in a capacitance of the touch electrodes.

In an embodiment, the touch electrodes may include: a plurality of driving electrodes spaced from one another along a first direction, and extending in a second direction crossing the first direction to be connected in parallel with each other; and a plurality of sensing electrodes spaced from one another along the second direction, and extending in the first direction to be connected in parallel with each other. Crossings between the plurality of driving electrodes and the plurality of sensing electrodes may define touch nodes.

In an embodiment, each of the touch driving signal lines may include branches in a number equal to a number of the plurality of divided areas, branching ends may be connected to corresponding ones of the driving electrodes of the divided areas, and an opposite end may be electrically connected to the touch driver circuit through a touch pad.

In an embodiment, the touch sensing area may be divided in half according to a length or a width in the first direction into first and second divided areas. Each of the touch driving signal lines may include branches associated with the first and second divided areas, respectively; branching ends may be connected to corresponding ones of the driving electrodes of the first and second divided areas; and an opposite end may be electrically connected to the touch driver circuit through a touch pad.

In an embodiment, the driving electrodes of each of the divided areas may be electrically connected to the branches of the touch driving signal lines in a same number as that of the divided areas, and may be connected to touch pads and the touch driver circuit through the branches of the touch driving signal lines.

In an embodiment, the touch sensing signal lines may include a plurality of first to $m^{th}$ sensing lines associated with each of the plurality of divided areas, each of the plurality of first to $m^{th}$ sensing lines of each of the divided areas being connected to a corresponding one of the sensing electrodes of a corresponding one of the divided areas, and the sensing electrodes for each of the divided areas may be electrically connected to touch pads and the touch driver circuit through corresponding ones of the plurality of first to $m^{th}$ sensing lines, where m is an integer.

In an embodiment, each of the touch driving signal lines may include branches in a number equal to a number of the plurality of divided areas; branching ends may be connected to corresponding ones of the driving electrodes of the divided areas; and an opposite end may be electrically connected to the touch driver circuit through a touch pad, and the touch sensing signal lines may be connected with the sensing electrodes for each of the plurality of divided areas, respectively.

In an embodiment, the touch driver circuit may be configured to: concurrently supply the touch driving signals to the driving electrodes located in each of the divided areas through the branches of the touch driving signal lines; and receive the touch sensing signals through the touch sensing signal lines connected with the sensing electrodes for each of the plurality of divided areas.

In an embodiment, the touch driver circuit may be configured to: sequentially select the touch driving signal lines including the branches to sequentially supply the touch driving signals to the driving electrodes located in each of the divided areas; and sequentially receive the touch sensing signals through the touch sensing signal lines.

According to one or more embodiments of the present disclosure, a display device includes: a display panel including a display area including a plurality of pixels; and a touch detection module located on a front of the display panel to detect a user's touch. The touch detection module includes: a touch sensing unit including: touch electrodes in a touch sensing area, the touch sensing area being divided into a plurality of divided areas; and touch driving signal lines and touch sensing signal lines in a touch peripheral area; and a touch driver circuit configured to: concurrently supply touch driving signals to the touch electrodes in each of the divided areas through the touch driving signal lines; and detect touch sensing signals of the touch electrodes from each of the divided areas through the touch sensing signal lines. The touch driver circuit is configured to concurrently detect the touch sensing signals from the divided areas, and measure an amount of change in a capacitance of the touch electrodes.

In an embodiment, the touch electrodes may include: a plurality of driving electrodes spaced from one another in a first direction, and extending in a second direction perpendicular to the first direction to be connected in parallel with each other; and a plurality of sensing electrodes spaced from one another in the second direction, and extending in the first direction to be connected in parallel with each other, and crossings of the plurality of driving electrodes and the plurality of sensing electrodes may define touch nodes.

In an embodiment, each of the touch driving signal lines may branch off in a number equal to a number of the plurality of divided areas, such that branching ends may be connected to corresponding ones of the driving electrodes of the divided areas, and an opposite end may be electrically connected to the touch driver circuit through a touch pad.

In an embodiment, the touch sensing area may be divided in half according to a length or a width in the first direction into first and second divided areas, and each of the touch driving signal lines may branch off to be associated with the first and second divided areas, respectively, such that branching ends may be connected to corresponding ones of the driving electrodes of the first and second divided areas, and an opposite end may be electrically connected to the touch driver circuit through a touch pad.

In an embodiment, the touch sensing signal lines may include a plurality of first to $m^{th}$ sensing lines associated with the plurality of divided areas, respectively, each of the plurality of first to $m^{th}$ sensing lines being connected with a respective one of the sensing electrodes located for each of the divided areas, and the sensing electrodes for each of the divided areas may be electrically connected to touch pads and the touch driver circuit through corresponding ones of the plurality of first to $m^{th}$ sensing lines, where m is an integer.

In an embodiment, each of the touch driving signal lines may branch off in a number equal to a number of the plurality of divided areas, such that branching ends may be connected to corresponding ones of the driving electrodes of the divided areas, and an opposite end may be electrically connected to the touch driver circuit through a touch pad, and the touch sensing signal lines may be connected with the sensing electrodes located for each of the plurality of divided areas, respectively.

In an embodiment, the touch driver circuit may be configured to: concurrently supply the touch driving signals to the driving electrodes in each of the divided areas through the branching touch driving signal lines; and receive the touch sensing signals through the touch sensing signal lines connected with the sensing electrodes for each of the plurality of divided areas.

In an embodiment, the touch driver circuit may be configured to: sequentially select the branching touch driving signal lines to sequentially supply the touch driving signals to the driving electrodes in each of the divided areas; and sequentially receive the touch sensing signals through the touch sensing signal lines.

According to some embodiments of the present disclosure, by reducing the size of touch electrodes and increasing the numbers of the touch electrodes and their channels, touch detection errors may be reduced, and touch detection accuracy and reliability may be improved.

According to some embodiments of the present disclosure, the number of touch driver circuits may be maintained or substantially maintained by way of improving the arrangement structure of the touch driving signal lines, the arrangement structure of the touch sensing signal lines, and the touch detection method (e.g., the touch detection scheme). As such, even though the number of touch electrodes and their channels are increased, the burden caused by the increased number of touch driver circuits and fabrication costs may be reduced.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
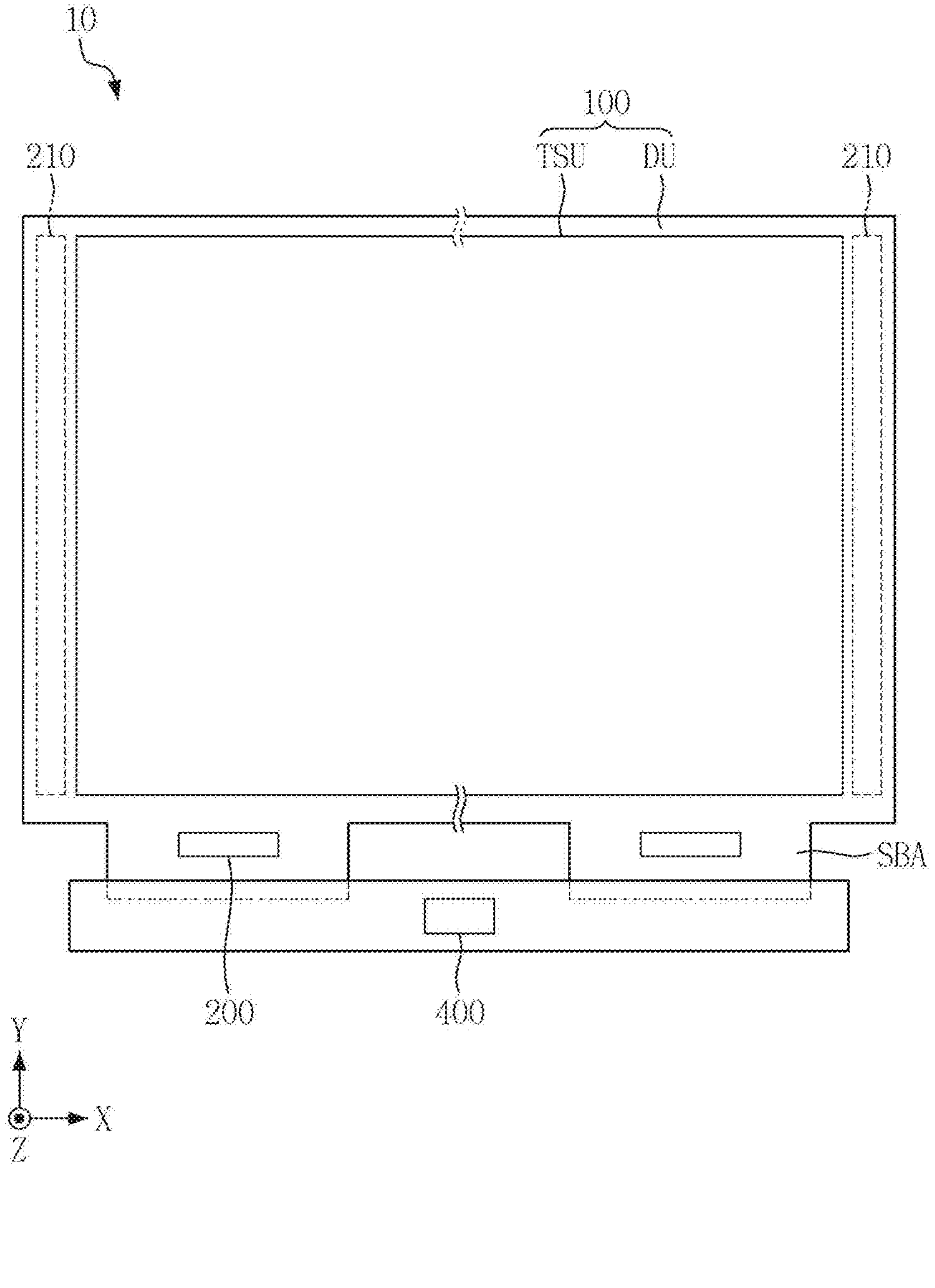
FIG. 1 is a plan view showing a configuration of a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use,"

"using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
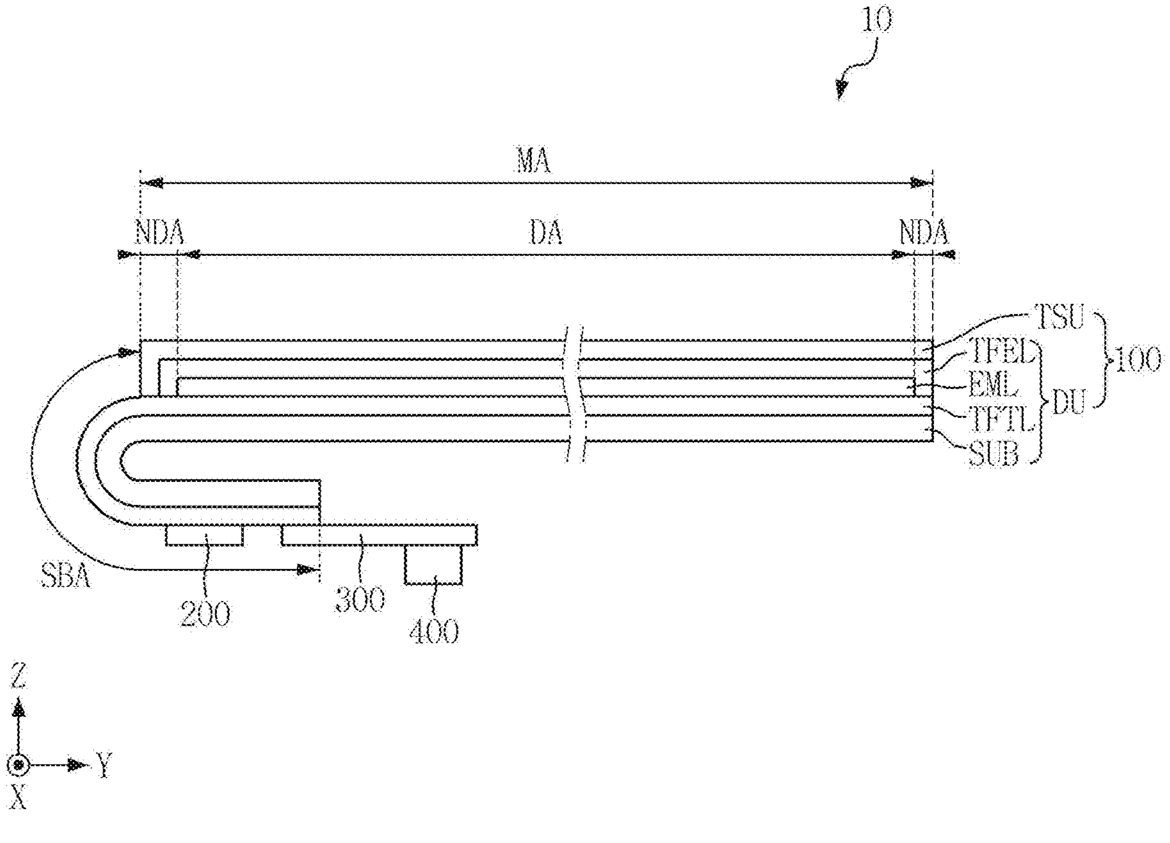
FIG. 2 is a cross-sectional view showing a side of the display device of FIG. 1 in more detail.

FIG. 1 is a plan view showing a configuration of a display device according to an embodiment of the present disclosure. FIG. 2 is a cross-sectional view showing a side of the display device of FIG. 1 in more detail.

Referring to FIGS. 1 and 2, a display device 10 according to an embodiment of the present disclosure may be employed by various suitable electronic devices, such as a tablet PC, a portable multimedia player (PMP), a navigation device, an ultra mobile PC (UMPC), an e-book, an electronic notebook, and a mobile communications terminal. In addition, the display device 10 may be used as a display unit (e.g., a display or a touch-display) of a television, a laptop computer, a monitor, an electronic billboard, or an Internet of Things (IoT) device.

As another example, the display device 10 according to an embodiment may be a foldable device, and may be applied to various suitable portable electronic devices, such as mobile phones, smart phones, electronic notebooks, and e-books.

The display device 10 according to embodiments may be variously classified by the way in which images are displayed. For example, the display device 10 may be classified into, and implemented as, an organic light-emitting diode display device (OLED), an inorganic light-emitting display device (inorganic EL), a quantum-dot light-emitting display device (QED), a micro LED display device (micro-LED), a nano LED display device (nano-LED), a plasma display device (PDP), a field emission display device (FED), a liquid crystal display device (LCD), an electrophoretic display device (EPD), and/or the like. Hereinafter, an organic light-emitting diode display device (OLED) will be described in more detail as a representative example of the display device. The organic light-emitting diode display device OLED may be simply referred to as the display device 10, unless otherwise necessary for distinguishing purposes. However, the present disclosure is not limited to the organic light-emitting diode display device (OLED), and any one of the above-listed display devices, or any other suitable display device known to those having ordinary skill in the art, may be employed as the display device 10, without departing from the spirit and scope of the present disclosure.

As used herein, a first direction (e.g., the x-axis direction) may be the longer side direction of the display device 10, for example, such as the horizontal direction of the display device 10. A second direction (e.g., the y-axis direction) may be the shorter side direction of the display device 10, for example, such as the vertical direction of the display device 10. A third direction (e.g., the z-axis direction) may refer to the thickness direction of the display device 10.

According to an embodiment of the present disclosure, the display device 10 may have a rectangular shape, a square shape, a circular shape, an elliptical shape, or a quadrangular shape when viewed from the top (e.g., in a plan view). For example, when the display device 10 is a mobile device, such as a tablet PC, and a foldable device, it may have a rectangular shape in which the longer sides are located in the horizontal direction. However, the present disclosure is not limited thereto. For example, the longer sides may be positioned in the vertical direction. As another example, the display device 10 may be installed rotatably, so that the longer sides are positioned in the horizontal or vertical direction variably.

The display device 10 includes a display panel 100, a display driver circuit 200, and a touch detection module (e.g., a touch detector or a touch detection sensor). The touch detection module includes a touch sensing unit (e.g., a touch sensor, a touch sensing layer, or a touch sensing panel) TSU and a touch driver circuit 400.

In more detail, the display panel 100 of the display device 10 may include a display unit (e.g., a display layer or a display panel) DU for displaying images, and the touch sensing unit TSU is disposed on the display unit DU to sense a part of a human body and/or an electronic pen. The display unit DU of the display panel 100 may include a plurality of pixels SP (e.g., see FIG. 3) that are arranged in a matrix, and may display images through the plurality of pixels SP. The touch sensing unit TSU may be mounted on the front surface of the display panel 100, or may be formed integrally with the display panel 100. The touch sensing unit TSU may include a plurality of touch electrodes to sense a user's touch by a capacitive sensing using the touch electrodes.

The display driver circuit 200 may output control signals and data voltages for driving the pixels SP arranged in the display unit DU. In more detail, the display driver circuit 200 supplies the data voltages to data lines connected to the pixels SP. In addition, the display driver circuit 200 may apply supply the voltages to voltage lines, and may supply gate control signals to a gate driver 210.

The touch driver circuit 400 of the touch detection module may be electrically connected to the touch sensing unit TSU. The touch driver circuit 400 may supply touch driving signals to a plurality of touch electrodes arranged in the touch sensing unit TSU, and may sense changes in a voltage magnitude of the touch electrodes and changes in a capacitance between the touch electrodes. For example, the touch driver circuit 400 may determine whether or not a user's touch is input, and may determine the coordinates of the touch based on the amount of the changes in the capacitance between the touch electrodes. The touch driver circuit 400 will be described in more detail below, such as the configuration and operation characteristics thereof.

The display driver circuit 200 may operate as a main processor, or may be formed integrally with the main processor. Accordingly, the display driver circuit 200 may control the overall functions of the display device 10. For example, the display driver circuit 200 may receive touch data from the touch driver circuit 400 to determine the user's touch coordinates, and may then generate digital video data based on the touch coordinates. In addition, the display driver circuit 200 may run and control an application indicated by an icon displayed on the user's touch coordinates. As another example, the display driver circuit 200 may receive coordinate data from an electronic pen, such as a smart pen, to determine the touch coordinates of the electronic pen, and may then generate digital video data according to the touch coordinates, or may run an application indicated by an icon displayed at the touch coordinates of the electronic pen.

Referring to FIG. 2, the display panel 100 may be divided into a main area MA and a subsidiary area SBA. The main area MA may include a display area DA where the pixels SP for displaying images are disposed, and a non-display area NDA located around the display area DA. In the display area DA, light may be emitted from an emission area or an opening area of each pixel SP to display an image. As such, each of the pixels SP in the display device DA may include a pixel circuit including switching elements, a pixel-defining layer that defines the emission area or the opening area, and a self-light-emitting element.

The non-display area NDA may be an edge or an outer area of the display area DA. The non-display area NDA may be defined as the edge of the main area MA of the display panel 100. In the non-display area NDA, the gate driver 210 that applies gate signals to gate lines, and fan-out lines that connect the display driver circuit 200 with the display area DA may be formed.

The subsidiary area SBA may be extended from one side of the main area MA. The subsidiary area SUB may include a flexible material that may be bent, folded, or rolled. For example, when the subsidiary area SBA is bent, the subsidiary area SBA may overlap with the main area MA in the thickness direction (e.g., the z-axis direction). The subsidiary area SBA may include pads connected to the display driver circuit 200 and the circuit board 300. Optionally, the subsidiary area SBA may be omitted as needed or desired, and the display driver circuit 200 and the pads may be disposed in the non-display area NDA.

At least one display driver circuit 200 may be implemented as an integrated circuit (IC), and may be attached on the display panel 100 by a chip-on-glass (COG) technique, a chip-on-plastic (COP) technique, or ultrasonic bonding. For example, the display driver circuit 200 may be disposed in the subsidiary area SBA, and may overlap with the main area MA in the thickness direction (e.g., the z-axis direction) as the subsidiary area SBA is bent. As another example, the display driver circuit 200 may be mounted on the circuit board 300.

The circuit board 300 may be electrically connected to the pads of the display panel 100 by an anisotropic conductive film (ACF). As such, lead lines of the circuit board 300 may be electrically connected to the pads of the display panel 100. The circuit board 300 may be a flexible printed circuit board (FPCB), a printed circuit board (PCB), or a flexible film, such as a chip-on-film (COF).

The touch driver circuit 400 may be mounted on a separate circuit board. The touch driver circuit 400 may be implemented as an integrated circuit (IC). As described above, the touch driver circuit 400 may apply touch driving signals to the touch electrodes of the touch sensing unit TSU. In addition, an amount of change in the mutual capacitance of each of touch nodes formed at intersections or crossings of the touch electrodes may be measured. In more detail, the touch driver circuit 400 may measure a change in a capacitance of the touch nodes according to a change in an amount of a voltage or a current of a touch sensing signal received through the touch electrodes. As such, the touch driver circuit 400 may determine whether or not there is a user's touch or a proximity (e.g., a near or close proximity), based on the amount of change in the mutual capacitance of each of the touch nodes. The touch driving signal may be a pulse signal having a suitable frequency (e.g., a predetermined frequency). The touch driver circuit 400 may determine whether or not there is touch by a part of a user's body, such as a finger, and may determine the coordinates of the touch, if any, based on the amount of the change in the capacitance between the touch electrodes.

In more detail, the touch driver circuit 400 may concurrently (e.g., simultaneously or substantially simultaneously) or sequentially supply the touch driving signals to the touch electrodes arranged in the touch sensing unit TSU to cross one another, and may concurrently (e.g., simultaneously or substantially simultaneously) or sequentially measure the amount of change in the capacitance of each of the touch nodes formed as the touch electrodes cross one another, to detect whether or not there is a user's touch.

On the other hand, the touch driver circuit 400 may divide the touch sensing area of the touch sensing unit TSU into a plurality of divided areas, and may concurrently (e.g., simultaneously or substantially simultaneously) drive the touch electrodes of the divided areas that are separated from one another to detect the position of the user's touch. In more detail, the touch sensing area of the touch sensing unit TSU may be divided into a plurality of divided areas in advance according to the area or width of the touch sensing area or the width in one direction. For example, the touch sensing area of the touch sensing unit TSU may be divided in half according to the length or width in the first direction (e.g., the x-axis direction), and accordingly, may be divided into first and second divided areas.

The touch driver circuit 400 may concurrently (e.g., simultaneously or substantially simultaneously) supply the touch driving signals to the touch electrodes disposed in the different divided areas (e.g., in the first and second divided areas), and may then measure the amount of changes in the capacitance through the touch electrodes again, thereby detecting the touch position of a finger, an electronic pen, and/or the like. For example, the touch driver circuit 400 supplies touch driving signals at the same or substantially the same timing as each other and for the same or substantially the same period as each other to the touch electrodes, respectively, that are disposed in the first and second divided areas during a touch driving period of at least one frame. Then, the touch driver circuit 400 may measure the amount of changes in the capacitance sequentially or concurrently (e.g., simultaneously or substantially simultaneously) through the touch electrodes during a touch sensing period.

Incidentally, when the touch driver circuit 400 senses the touch position by sequentially supplying the touch driving signals to the touch electrodes for each of the plurality of divided areas in the touch sensing area, it may be possible to reduce an effect of an external or an internal electro magnetic interference (EMI). In more detail, it may be possible to reduce a touch detection period by way of supplying the touch driving signals to touch electrodes disposed in each of the divided areas (e.g., the first and second divided areas) of the touch sensing area, and then detecting the touch position concurrently (e.g., simultaneously or substantially simultaneously) in each of the divided areas. Accordingly, even though the size and the area of the touch electrodes are reduced, and the number of touch electrodes is increased, the touch position detection period may be maintained or shortened by concurrently (e.g., simultaneously or substantially simultaneously) driving the touch electrodes for each of the divided areas, and detecting the touch position.

In addition, by concurrently (e.g., simultaneously or substantially simultaneously) supplying the touch driving signals to the touch electrodes disposed in each of the divided areas, and concurrently (e.g., simultaneously or substantially simultaneously) detecting the touch position for each of the divided areas, it may be possible to detect the touch position coordinates for each of the divided areas in which the number of touch electrodes is increased, without increasing the number of touch driver circuit 400. In order to concurrently (e.g., simultaneously or substantially simultaneously) supply the touch driving signals to the touch electrodes disposed in each of the divided areas, the touch driving signal lines may branch off so that they are connected to the touch electrodes in different divided areas. In addition, the touch sensing signal lines may be connected to touch electrodes disposed in each of the divided areas.

The touch driver circuit 400 concurrently (e.g., simultaneously or substantially simultaneously) supplies the touch driving signals to the touch electrodes disposed in the different divided areas through the branching touch driving signal lines. The touch driver circuit 400 may sequentially supply the touch driving signals to the branching touch driving signal lines. Then, the touch driver circuit 400 may receive touch sensing signals from the touch electrodes for each of the divided areas through touch sensing signal lines, and may detect the touch position and the coordinates of the touch position by measuring the amount of changes in the capacitance of each of the touch nodes.

The connection structure of the touch driving signal lines and the touch sensing signal lines, and the driving characteristics of the touch driver circuit 400 will be described in more detail below.

The substrate SUB of the display panel 100 shown in FIG. 2 may be a base substrate or a base member. The substrate SUB may be a flexible substrate that may be bent, folded, or rolled. For example, the substrate SUB may include, but is not limited to, a glass material or a metal material. As another example, the substrate SUB may include a polymer resin, such as polyimide PI.

The thin-film transistor layer TFTL may be disposed on the substrate SUB. The thin-film transistor layer TFTL may include a plurality of thin-film transistors for forming pixel circuits of the pixels SP. The thin-film transistor layer TFTL may include gate lines, data lines, voltage lines, gate control lines, fan-out lines for connecting the display driver circuit 200 with the data lines, lead lines for connecting the display driver circuit 200 with the pads, and the like. When the gate driver 210 is formed on one side of the non-display area NDA of the display panel 100, the gate driver 210 may also include a plurality of thin-film transistors.

The thin-film transistor layer TFTL may be disposed in the display area DA, the non-display area NDA, and the subsidiary area SBA. The thin-film transistors in each of the pixels, the gate lines, the data lines, and the voltage lines in the thin-film transistor layer TFTL may be disposed in the display area DA. The gate control lines and the fan-out lines in the thin-film transistor layer TFTL may be disposed in the non-display area NDA. The lead lines of the thin-film transistor layer TFTL may be disposed in the subsidiary area SBA.

The emission material layer EML may be disposed on the thin-film transistor layer TFTL. The emission material layer EML may include a plurality of light-emitting elements, each of which includes a first electrode, an emissive layer, and a second electrode that are stacked on one another sequentially to emit light, and a pixel-defining layer for defining the pixels. The plurality of light-emitting elements in the emission material layer EML may be disposed in the display area DA.

An encapsulation layer TFEL may cover the upper and side surfaces of the emission material layer EML, and may protect the emission material layer EML. The encapsulation layer TFEL may include at least one inorganic layer and at least one organic layer for encapsulating the emission material layer EML.

The touch sensing unit TSU may be disposed on the encapsulation layer TFEL. The touch sensing unit TSU may include a plurality of touch electrodes for sensing a user's touch by capacitive sensing, and touch lines connecting the plurality of touch electrodes with the touch driver circuit 400. For example, the touch sensor unit TSU may sense a user's touch by a self-capacitance sensing or a mutual capacitance sensing.

As another example, the touch sensing unit TSU may be disposed on a separate substrate that is disposed on the display unit DU. In such case, the substrate for supporting the touch sensing unit TSU may be a base member for encapsulating the display unit DU.

The plurality of touch electrodes included the touch sensing unit TSU may be disposed in the touch sensing area overlapping with the display area DA. The touch lines of the touch sensing unit TSU may be disposed in a touch peripheral area overlapping with the non-display area NDA.

Figure 3:
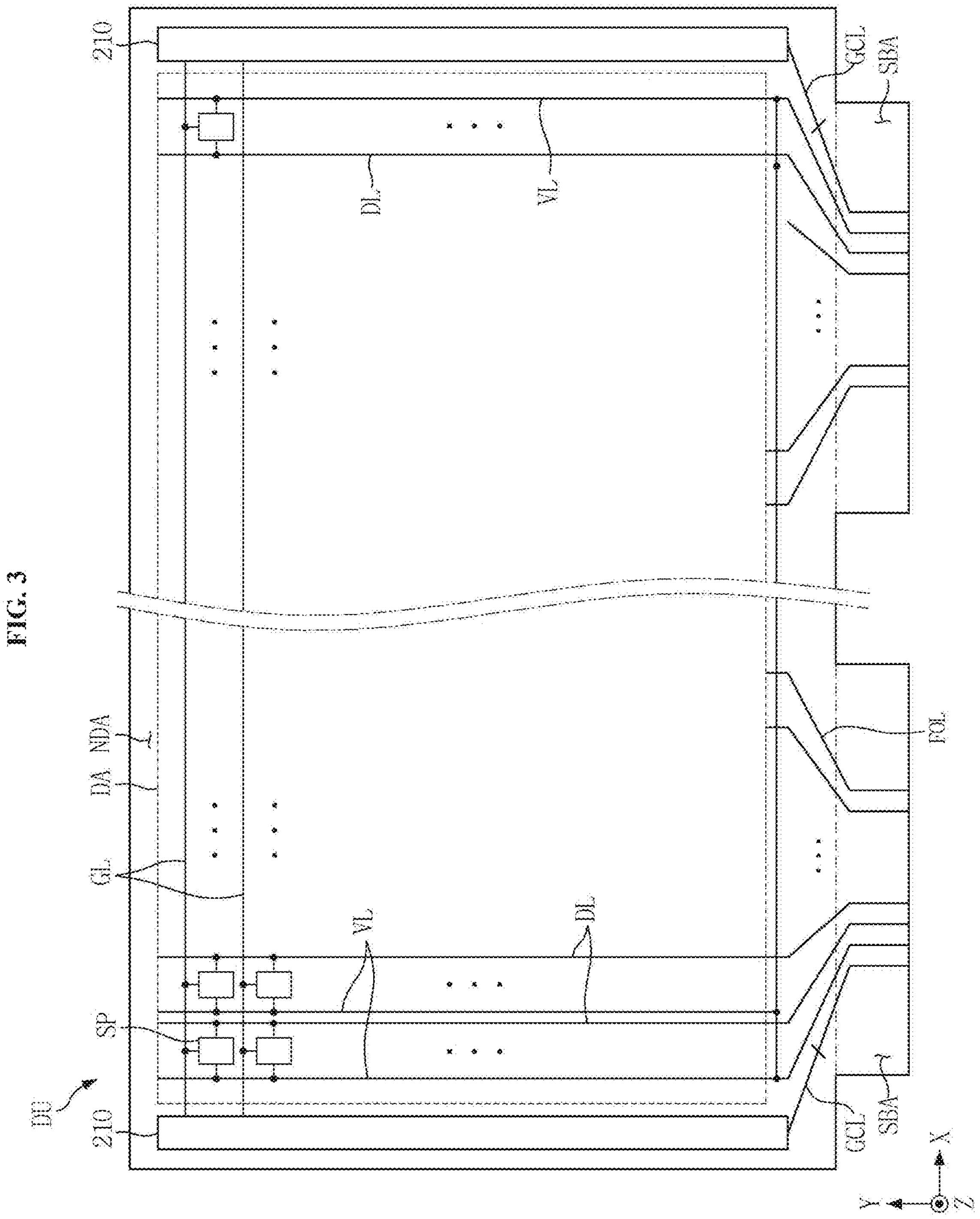
FIG. 3 is a schematic view showing a layout of a display panel according to an embodiment of the present disclosure.

FIG. 3 is a schematic view showing a layout of a display panel according to an embodiment of the present disclosure. In more detail, FIG. 3 is a schematic layout view showing the display area DA and the non-display area NDA of the display unit DU before the touch sensing unit TSU is formed.

The display area DA displays images therein, and may be defined as a central area of the display panel 100. The display area DA may include a plurality of pixels SP, a plurality of gate lines GL, a plurality of data lines DL, and a plurality of voltage lines VL. Each of the plurality of pixels SP may be defined as a minimum unit that outputs light.

The plurality of gate lines GL may supply the gate signals received from the gate driver 210 to the plurality of pixels SP. The plurality of gate lines GL may extend in the x-axis direction, and may be spaced apart from one another along the y-axis direction crossing the x-axis direction.

The plurality of data lines DL may provide the data voltages received from the display driver circuit 200 to the plurality of pixels SP. The plurality of data lines DL may extend in the y-axis direction, and may be spaced apart from one another along the x-axis direction.

The plurality of voltage lines VL may supply the supply voltage received from the display driver circuit 200 to the plurality of pixels SP. The supply voltage may be at least one of a driving voltage, an initialization voltage, or a reference voltage. The plurality of voltage lines VL may extend in the y-axis direction, and may be spaced apart from one another along the x-axis direction.

The non-display area NDA may surround (e.g., around a periphery of) the display area DA. The non-display area NDA may include the gate driver 210, fan-out lines FOL, and gate control lines GCL. The gate driver 210 may generate a plurality of gate signals based on the gate control signal, and may sequentially supply the plurality of gate signals to the plurality of gate lines GL in a suitable order (e.g., a predetermined order).

The fan-out lines FOL may extend from the display driver circuit 200 to the display area DA. The fan-out lines FOL may supply the data voltage received from the display driver circuit 200 to the plurality of data lines DL.

The gate control line GCL may extend from the display driver circuit 200 to the gate driver 210. The gate control line GCL may supply the gate control signal received from the display driver circuit 200 to the gate driver 210.

The display driver circuit 200 may output signals and voltages for driving the display panel 100 to the fan-out lines FOL. The display driver circuit 200 may provide data voltages to the data lines DL through the fan-out lines FOL. The data voltages may be applied to the plurality of pixels SP, so that a luminance of the plurality of pixels SP may be determined. The display driver circuit 200 may supply the gate control signal to the gate driver 210 through the gate control lines GCL.

Figure 4:
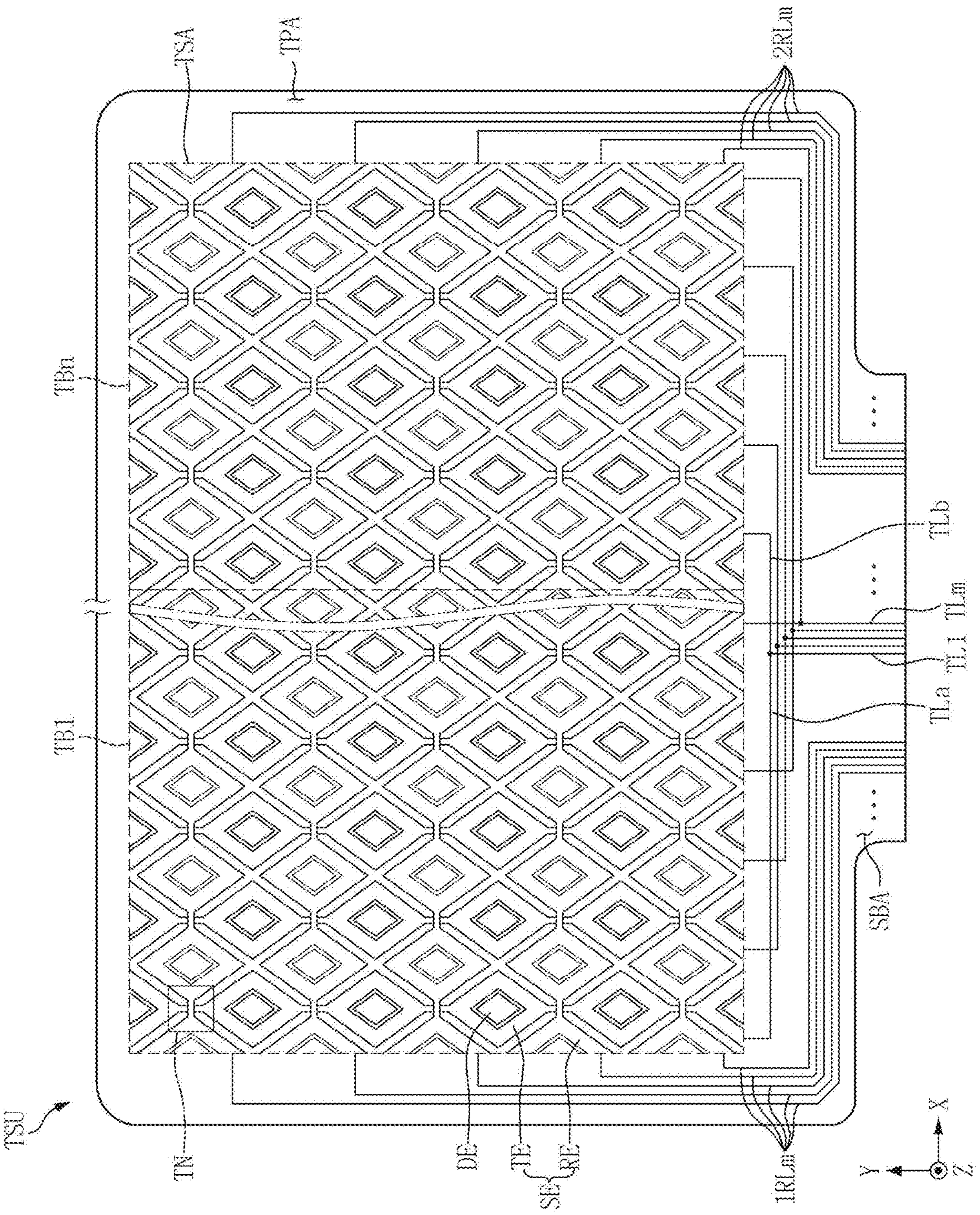
FIG. 4 is a schematic view showing a layout of a touch detection module according to an embodiment of the present disclosure.

FIG. 4 is a schematic view showing a layout of a touch detection module (e.g., a touch detector or a touch detection sensor) according to an embodiment of the present disclosure.

Referring to FIG. 4, the touch sensing unit TSU of the touch detection module may include a touch sensing area TSA that senses a user's touch, and a touch peripheral area TPA around the touch sensing area TSA.

The touch sensing area TSA may cover the display area DA and the non-display area NDA of the display unit DU, and may overlap with the display area DA and the non-display area NDA. Because the non-display area NDA is the bezel area, the outer areas of the touch sensing area TSA that overlap with and is in line with the non-display area NDA may correspond to the bezel area.

The touch peripheral area TPA may correspond to the non-display area NDA where the gate driver 210 and the like are disposed. On the other hand, the touch sensing area TSA may extend, such that it overlaps with and is disposed on the non-display area NDA excluding the arrangement area of the gate driver 210.

The touch sensing area TSA may be divided in advance into a plurality of divided areas TB1 to TBn according to the area or the width of the touch sensing area TSA, or the width in one direction, and/or the like, where n is a positive integer. For example, the touch sensing area TSA of the touch sensing unit TSU may be divided in half according to the length or the width in the first direction (e.g., the x-axis direction), and accordingly, may be divided into first and second divided areas TB1 and TBn.

Each of the divided areas TB1 to TBn of the touch sensing area TSA may include a plurality of touch electrodes SE and a plurality of dummy patterns DE. The plurality of touch electrodes SE may form a mutual capacitance or a self-capacitance to sense a touch of an object or person. The plurality of touch electrodes SE may include a plurality of driving electrodes TE and a plurality of sensing electrodes RE.

The plurality of driving electrodes TE may be arranged along the x-axis direction and the y-axis direction. The plurality of driving electrodes TE may be spaced apart from one another in the x-axis direction and the y-axis direction. The driving electrodes TE that are adjacent to one another in the y-axis direction may be electrically connected to one another through the corresponding connection electrodes. In more detail, the driving electrodes TE that are adjacent to one another in the y-axis direction may be electrically connected to each other by the plurality of connection electrodes. In this case, even if one of the connection electrodes is disconnected, the driving electrodes TE may be stably connected to one another through the remaining connection electrodes. The driving electrodes TE that are adjacent to one another may be connected to each other by two connection electrodes, but the number of connection electrodes is not limited thereto. The structure of the connection electrodes will be described in more detail below.

First, the connection electrodes will be described briefly in more detail. The connection electrodes may be disposed in a different layer from that of the plurality of driving electrodes TE and/or the plurality of sensing electrodes RE. The driving electrodes TE that are adjacent to one another in the y-axis direction may be electrically connected to each other through the connection electrodes disposed at (e.g., in or on) a different layer from that of the plurality of driving electrodes TE or the plurality of sensing electrodes RE. The connection electrodes may be formed on a rear layer (e.g., a lower layer) of the layer at (e.g., in or on) which the driving electrodes TE and the sensing electrodes RE are formed. The connection electrodes are electrically connected to the adjacent driving electrodes TE through a plurality of contact holes, respectively. Accordingly, even though the connection electrodes overlap with the plurality of sensing electrodes RE in the z-axis direction, the plurality of driving electrodes TE and the plurality of sensing electrodes RE may be insulated from each other. Mutual capacitances may be formed between the driving electrodes TE and the sensing electrodes RE.

The sensing electrodes RE may be electrically extended in the first direction (e.g., the x-axis direction), and may be spaced apart from one another in the second direction (e.g., the y-axis direction). In other words, the plurality of sensing electrodes RE may be arranged along the first direction (e.g., the x-axis direction) and the second direction (e.g., the y-axis direction), and the sensing electrodes RE that are adjacent to one another in the first direction (e.g., the x-axis direction) may be electrically connected to each other through connection portions. The sensing electrodes RE adjacent to one another in the first direction (e.g., the x-axis direction) may be electrically connected to one another through connection portions disposed at (e.g., in or on) the same layer as that of the plurality of driving electrodes TE or the plurality of sensing electrodes RE. The sensing electrodes RE disposed in the touch sensing area TSA may all be connected with one another other in the first direction (e.g., the x-axis direction) through the connection portions in the first direction (e.g., the x-axis direction). On the other hand, the sensing electrodes RE for each of the divided areas TB1 to TBn may be connected with one another in the first direction (e.g., the x-axis direction).

Touch nodes TN may be formed at crossing or intersections of the connection electrodes connecting between the driving electrodes TE and the connection portions of the sensing electrodes RE. The touch nodes TN may be arranged in a matrix in the touch sensing area TSA.

Each of a plurality of dummy electrodes DE may be surrounded (e.g., around a periphery thereof) by a driving electrode TE or a sensing electrode RE. Each of the plurality of dummy patterns DE may be spaced apart from and insulated from the driving electrode TE or the sensing electrode RE. Accordingly, the dummy patterns DE may be electrically floating (e.g., electrically floated).

Referring to FIG. 4, the driving electrodes TE of each of the divided areas TB1 to TBn may be electrically connected to the branching touch driving signal lines TL1 to TLm of the same number as that of the divided areas TB1 to TBn, and may be connected to touch pads and a touch driver circuit 400 on one outer side through the branching touch driving signal lines TL1 to TLm, where m is a positive integer.

Each of the touch driving signal lines TL1 to TLm may branch off so that its number is equal to the number of divided areas TB1 to TBn. The branching ends are connected to the respective driving electrodes TE for each of the divided areas TB1 to TBn, and the other ends are connected to the touch driver circuit 400 through touch pads. For example, from among the plurality of touch driving signal lines TL1 to TLm, the first touch driving signal line TL1 branches off so that its number is equal to the number of divided areas TB1 to TBn, and branching lines on one side TLa and TLb are respectively connected to the first driving electrodes TE for the divided areas TB1 to TBn. The line on the opposite side that does not branch off is connected to the touch driver circuit 400 through the touch pad. Similarly, from among the plurality of touch driving signal lines TL1 to TLm, the second touch driving signal line branches off so that its number is equal to the number of divided areas TB1 to TBn, and branching lines on one side are respectively connected to the second driving electrodes TE for the divided areas TB1 to TBn. The line on the opposite side that does not branch off is connected to the touch driver circuit 400 through the touch pad. As such, from among the plurality of touch driving signal lines TL1 to TLm, the $m^{th}$ touch driving signal line branches off so that its number is equal to the number of divided areas TB1 to TBn, and branching lines on one side are respectively connected to the $m^{th}$ driving electrodes TE for the divided areas TB1 to TBn. The line on the opposite side that does not branch off is connected to the touch driver circuit 400 through the touch pad.

The first to $n^{th}$ driving electrodes TE of the divided areas TB1 to TBn are electrically connected to the touch pads and the touch driver circuit 400 through the respective branching touch driving signal lines TL1 to TLm.

The sensing electrodes RE of the divided areas TB1 to TBn are electrically connected with the touch pads and the touch driver circuit 400 through a plurality of first to $m^{th}$ sensing lines 1RLm and 2RLm for the respective divided areas TB1 to TBn.

For example, the sensing electrodes RE of the first divided area TB1 are electrically connected to the touch pads and the touch driver circuit 400 through a plurality of first sensing lines 1RLm. One ends of the plurality of first sensing lines 1RLm may be connected to the sensing electrodes RE of the first divided area TB1, respectively, and the other ends thereof may extend to the touch pads. The sensing electrodes RE of the $n^{th}$ divided area TBn are electrically connected to the touch pads and the touch driver circuit 400 through a plurality of second sensing lines 2RLm. Likewise, one ends of the plurality of second sensing lines 2RLm may be connected to the sensing electrodes RE of the $n^{th}$ divided area TBn, respectively, and the other ends thereof may extend to the touch pads.

Figure 5:
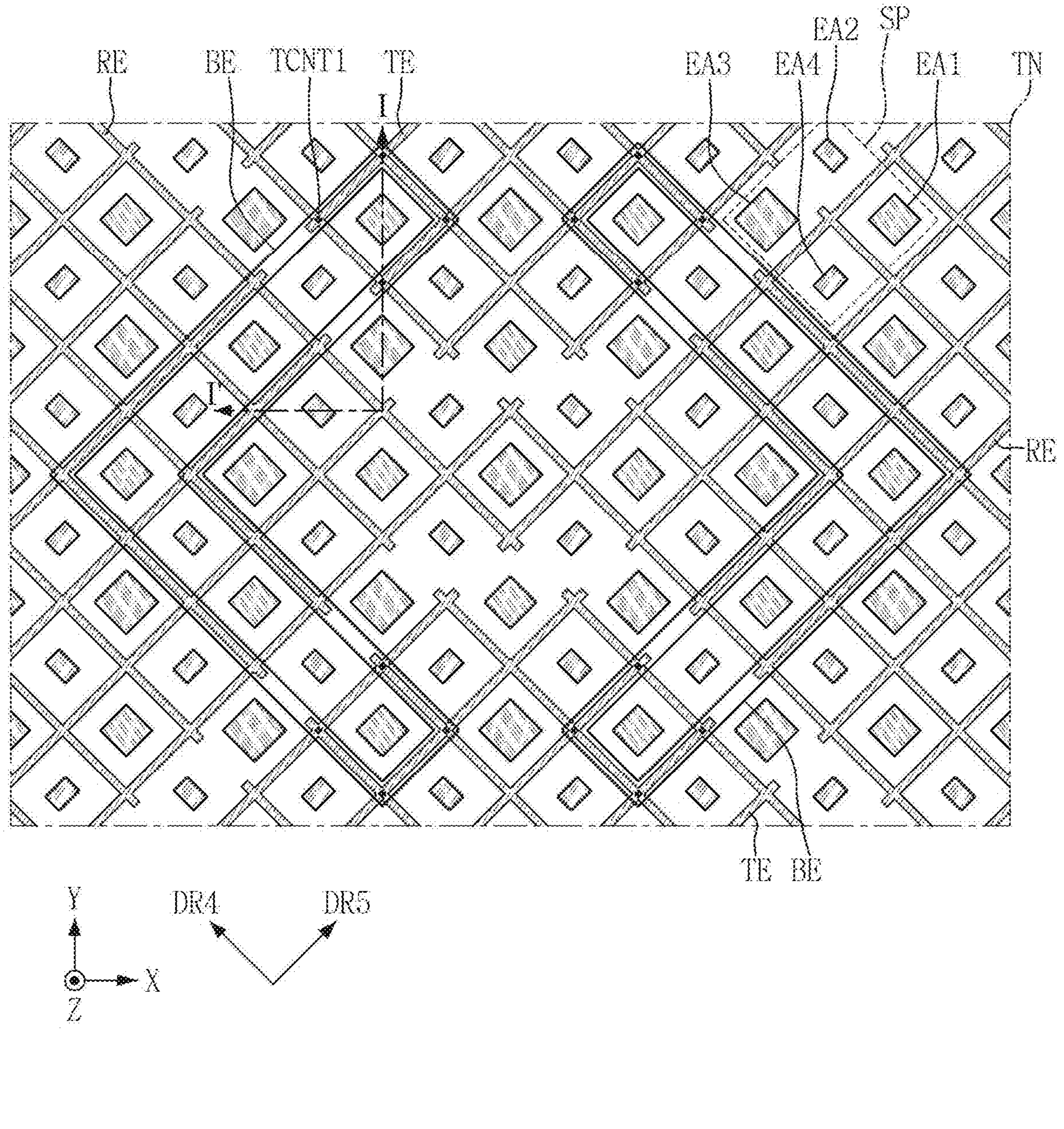
FIG. 5 is an enlarged plan view of touch nodes of FIG. 4 in more detail.

FIG. 5 is an enlarged plan view of the touch nodes of FIG. 4 in more detail.

Referring to FIG. 5, the touch nodes TN may be defined as the crossings or intersections of the driving electrodes TE and the sensing electrodes RE.

The driving electrodes TE and the sensing electrodes RE may be disposed at (e.g., in or on) the same layer as each other, and thus, may be spaced apart from each other. In other words, there may be a gap between adjacent ones of the driving electrodes TE and the sensing electrodes RE. In addition, the dummy patterns DE may also be disposed at (e.g., in or on) the same layer as that of the driving electrodes TE and the sensing electrodes RE. In other words, there may be a gap between adjacent ones of the driving electrodes TE and the dummy patterns DE, and between adjacent ones of the sensing electrodes RE and the dummy patterns DE.

Bridge electrodes BE may be disposed at (e.g., in or on) a different layer from that of the driving electrodes TE and the sensing electrodes RE. Each of the bridge electrodes BE may be bent at least once. The bridge electrodes BE may have a shape of angle brackets "<" or ">" as shown in the example shown in FIG. 5, but the shape of the bridge electrodes BE when viewed from the top (e.g., in a plan view) is not limited thereto. Because the driving electrodes TE that are adjacent to each other in the second direction (e.g., the y-axis direction) are connected to each other by the plurality of bridge electrodes BE, even if any of the bridge electrodes BE is disconnected, the driving electrodes TE may still be stably connected with each other in the second direction (e.g., the y-axis direction). Although two adjacent ones of the driving electrodes TE are connected to each other by two bridge electrodes BE in the example shown in FIG. 5, the number of bridge electrodes BE is not limited to two.

The bridge electrodes BE may overlap with the driving electrodes TE that are adjacent to one another in the second direction (e.g., the y-axis direction) in the third direction (e.g., the z-axis direction), which is the thickness direction of the substrate SUB. The bridge electrodes BE may overlap with the sensing electrodes RE in the third direction (e.g., the z-axis direction). One side of each of the bridge electrodes BE may be connected to one of the driving electrodes TE that are adjacent to each other in the second direction (e.g., the y-axis direction) through touch contact holes TCNT1. The other side of each of the bridge electrodes BE may be connected to another one of the driving electrodes TE that are adjacent to each other in the second direction (e.g., the y-axis direction) through touch contact holes TCNT1.

The driving electrodes TE and the sensing electrodes RE may be electrically separated from each other at their crossings or intersections by virtue of the bridge electrodes BE. Accordingly, a mutual capacitance may be formed between the driving electrodes TE and the sensing electrodes RE.

Each of the driving electrodes TE, the sensing electrodes RE, and the bridge electrodes BE may have a mesh structure or a net structure when viewed from the top (e.g., in a plan view). In addition, each of the dummy patterns DE may have a shape of a mesh structure or a net structure when viewed from the top (e.g., in a plan view). Accordingly, the driving electrodes TE, the sensing electrodes RE, the bridge electrodes BE, and the dummy patterns DE may not overlap with the emission areas EA1, EA2, EA3, and EA4 of each of the pixels SP. Therefore, it may be possible to prevent or substantially prevent the luminances of the light emitted from the emission areas EA1, EA2, EA3, and EA4 from being lowered, which may occur when the light is covered by the driving electrodes TE, the sensing electrodes RE, the bridge electrodes BE, and the dummy patterns DE.

Each of the pixels SP includes a first emission area EA1 that emits light of a first color, a second emission area EA2 that emits light of a second color, a third emission area EA3 that emits light of a third color, and a fourth emission area EA4 that emits light of the second color. For example, the first color may be red, the second color may be green, and the third color may be blue. As another example, the first and third emission areas EA1 and EA3 may emit green light, which is the light of the second color, the second emission area EA2 may emit red light, which is the light of the first color, and the fourth emission area EA4 may emit blue light, which is the light of the third color.

In each of the pixels SP, the first emission area EA1 and second emission area EA2 may be adjacent to each other in a fourth direction DR4, and the third emission area EA3 and the fourth emission area EA4 may be adjacent to each other in the fourth direction DR4. In each of the pixels SP, the first emission area EA1 and fourth emission area EA4 may be adjacent to each other in a fifth direction DR5, and the second emission area EA2 and the third emission area EA3 may be adjacent to each other in the fifth direction DR5.

Each of the first emission area EA1, the second emission area EA2, the third emission area EA3, and the fourth emission area EA4 may have, but is not limited to, a diamond shape or a rectangular shape when viewed from the top (e.g., in a plan view). In some embodiments, each of the first emission area EA1, the second emission area EA2, the third emission area EA3, and the fourth emission area EA4 may have any suitable shape, such as a polygonal shape different from a quadrangular shape, a circular shape, or an elliptical shape when viewed from the top (e.g., in a plan view). In addition, while FIG. 5 shows that the third emission area EA3 is the largest, and the second emission area EA2 and the fourth emission area EA4 are the smallest, the present disclosure is not limited thereto.

Figure 6:
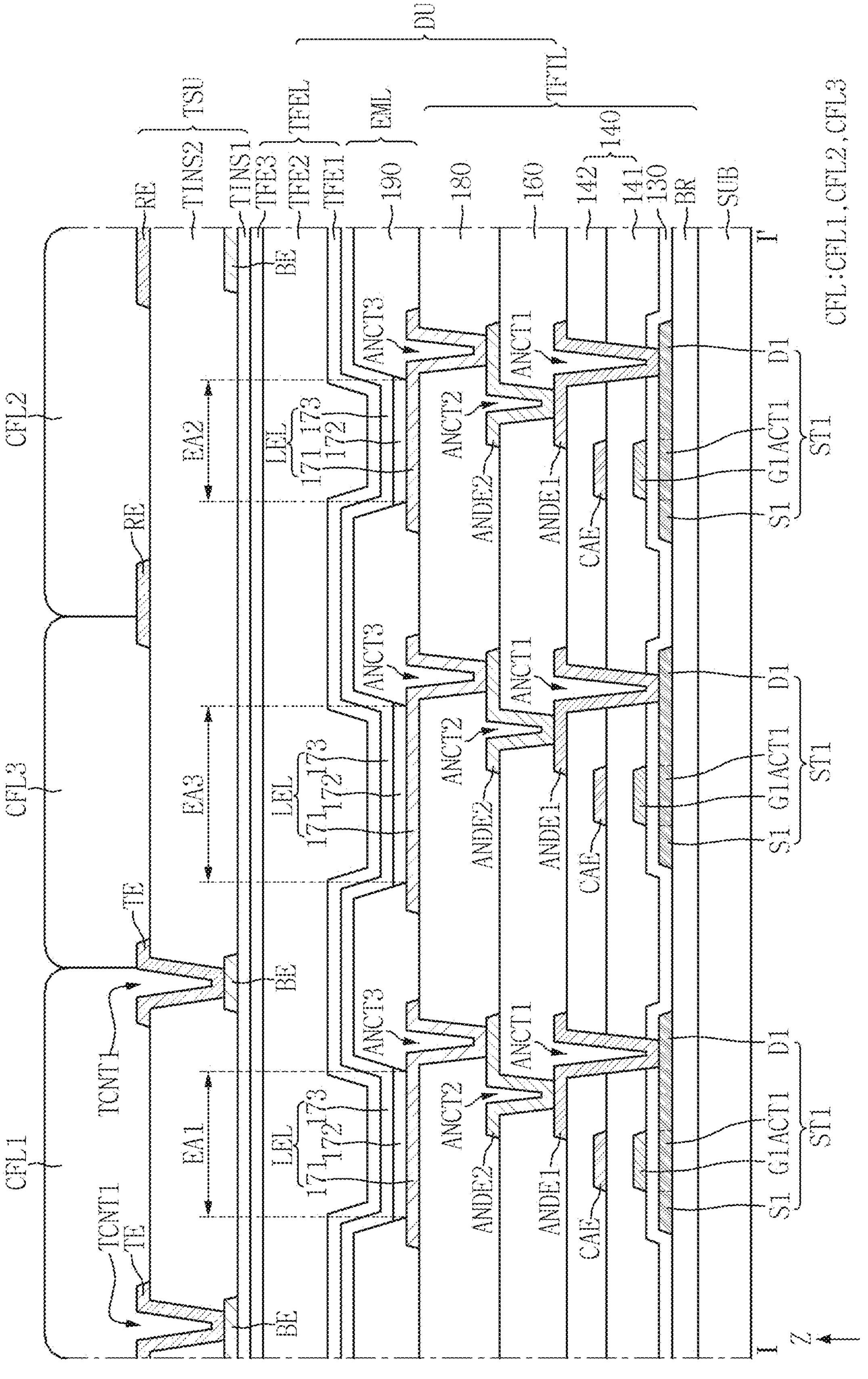
FIG. 6 is a cross-sectional view of the display panel taken along the line I-I' of FIG. 5.

FIG. 6 is a cross-sectional view of the display panel taken along the line I-I-' of FIG. 5.

Referring to FIG. 6, a barrier layer BR may be disposed on the substrate SUB. The substrate SUB may include (e.g., may be made of) an insulating material, such as a polymer resin. For example, the substrate SUB may include (e.g., may be made of) polyimide. The substrate SUB may be a flexible substrate that may be bent, folded, or rolled.

The barrier layer BR is a film for protecting the thin-film transistors of the thin-film transistor layer TFTL and an emissive layer 172 of the emission material layer EML. The barrier layer BR may include (e.g., may be made up of) multiple inorganic layers that are stacked one on another alternately. For example, the barrier layer BR may include (e.g., may be made up of) multiple layers in which one or more inorganic layers of a silicon nitride layer, a silicon oxynitride layer, a silicon oxide layer, a titanium oxide layer, and/or an aluminum oxide layer are alternately stacked on one another.

Thin-film transistors ST1 may be disposed on the barrier layer BR. Each of the thin-film transistors ST1 includes an active layer ACT1, a gate electrode G1, a source electrode S1, and a drain electrode D1.

The active layer ACT1, the source electrode S1 and the drain electrode D1 of each of the thin-film transistors ST1 may be disposed on the barrier layer BR. The active layer ACT1 of each of the thin-film transistors ST1 includes polycrystalline silicon, single crystalline silicon, a low-temperature polycrystalline silicon, amorphous silicon, or an oxide semiconductor. A part of the active layer ACT1 overlapping with the gate electrode G1 in the third direction (e.g., the z-axis direction) that is the thickness direction of the substrate SUB may be defined as a channel region. The source electrode S1 and the drain electrode D1 are regions that do not overlap with the gate electrode G1 in the third direction (e.g., the z-axis direction), and may have a conductivity by doping ions or impurities into a silicon semiconductor or an oxide semiconductor.

A gate insulator 130 may be disposed on the active layer ACT1, the source electrode S1, and the drain electrode D1 of each of the thin-film transistors ST1. The gate insulator 130 may be formed of an inorganic layer, for example, such as a silicon nitride layer, a silicon oxynitride layer, a silicon oxide layer, a titanium oxide layer, or an aluminum oxide layer.

The gate electrode G1 of each of the thin-film transistors ST1 may be disposed on the gate insulator 130. The gate electrode G1 may overlap with the active layer ACT1 in the third direction (e.g., the z-axis direction). The gate electrode G1 may include (e.g., may be made up of) a single layer or multiple layers of at least one of molybdenum (Mo), aluminum (Al), chromium (Cr), gold (Au), titanium (Ti), nickel (Ni), neodymium (Nd), copper (Cu), or a suitable alloy thereof.

A first interlayer dielectric layer 141 may be disposed on the gate electrode G1 of each of the thin-film transistors ST1. The first interlayer dielectric layer 141 may be formed of an inorganic layer, for example, such as a silicon nitride layer, a silicon oxynitride layer, a silicon oxide layer, a titanium oxide layer, or an aluminum oxide layer. The first interlayer dielectric layer 141 may include (e.g., may be made of) a plurality of inorganic layers.

A capacitor electrode CAE may be disposed on the first interlayer dielectric layer 141. The capacitor electrode CAE may overlap with the gate electrode G1 of the first thin-film transistor ST1 in the third direction (e.g., the z-axis direction). Because the first interlayer dielectric layer 141 has a dielectric constant (e.g., a predetermined dielectric constant), a capacitor may be formed by the capacitor electrode CAE, the gate electrode G1, and the first interlayer dielectric layer 141 disposed therebetween. The capacitor electrode CAE may include (e.g., may be made up of) a single layer or multiple layers of at least one of molybdenum (Mo), aluminum (Al), chromium (Cr), gold (Au), titanium (Ti), nickel (Ni), neodymium (Nd), copper (Cu), or a suitable alloy thereof.

A second interlayer dielectric layer 142 may be disposed over the capacitor electrode CAE. The second interlayer dielectric layer 142 may be formed of an inorganic layer, for example, such as a silicon nitride layer, a silicon oxynitride layer, a silicon oxide layer, a titanium oxide layer, or an aluminum oxide layer. The second interlayer dielectric layer 142 may include (e.g., may be made of) a plurality of inorganic layers.

A first anode connection electrode ANDE1 may be disposed on the second interlayer dielectric layer 142. The first anode connection electrode ANDE1 may be connected to the drain electrode D1 of the thin-film transistor ST1 through a first connection contact hole ANCT1 that penetrates the gate insulator 130, the first interlayer dielectric layer 141, and the second interlayer dielectric layer 142. The first anode connection electrode ANDE1 may include (e.g., may be made up of) a single layer or multiple layers of at least one of molybdenum (Mo), aluminum (Al), chromium (Cr), gold (Au), titanium (Ti), nickel (Ni), neodymium (Nd), copper (Cu), or a suitable alloy thereof.

A first planarization layer 160 may be disposed over the first anode connection electrode ANDE1 for providing a flat or substantially flat surface over level differences due to the thin-film transistor ST1. The first planarization layer 160 may be formed of an organic layer, such as an acryl resin, an epoxy resin, a phenolic resin, a polyamide resin, and/or a polyimide resin.

A second anode connection electrode ANDE2 may be disposed on the first planarization layer 160. The second anode connection electrode ANDE2 may be connected to the first anode connection electrode ANDE1 through a second connection contact hole ANCT2 penetrating the first planarization layer 160. The second anode connection electrode ANDE2 may include (e.g., may be made up of) a single layer or multiple layers of at least one of molybdenum (Mo), aluminum (Al), chromium (Cr), gold (Au), titanium (Ti), nickel (Ni), neodymium (Nd), copper (Cu), or a suitable alloy thereof.

A second planarization layer 180 may be disposed on the second anode connection electrode ANDE2. The second planarization layer 180 may be formed as an organic layer, such as an acryl resin, an epoxy resin, a phenolic resin, a polyamide resin, and/or a polyimide resin.

Light-emitting elements LEL and a bank 190 may be disposed on the second planarization layer 180. Each of the light-emitting elements LEL may include a pixel electrode 171, an emissive layer 172, and a common electrode 173.

The pixel electrode 171 may be disposed on the second planarization layer 180. The pixel electrode 171 may be connected to the second anode connection electrode ANDE2 through a third connection contact hole ANCT3 penetrating the second planarization layer 180.

In a top-emission structure in which light exits from the emissive layer 172 toward the common electrode 173, the pixel electrode 171 may include (e.g., may be made of) a metal material having a high reflectivity, such as a stacked structure of aluminum and titanium (Ti/Al/Ti), a stacked structure of aluminum and indium tin oxide (ITO) (ITO/Al/ITO), an APC alloy, and/or a stacked structure of an APC alloy and ITO (ITO/APC/ITO). The APC alloy is an alloy of silver (Ag), palladium (Pd), and copper (Cu).

In order to define the first emission area EA1, the second emission area EA2, the third emission area EA3, and the fourth emission area EA4 described above with reference to FIG. 5, the bank 190 may be formed to partition the pixel electrode 171 on the second planarization layer 180. The bank 190 may be disposed to cover edges of the pixel electrode 171. The bank 190 may be formed of an organic layer, such as an acryl resin, an epoxy resin, a phenolic resin, a polyamide resin, and/or a polyimide resin.

In each of the first emission area EA1, the second emission area EA2, the third emission area EA3, and the fourth emission area EA4, the pixel electrode 171, the emissive layer 172, and the common electrode 173 are stacked on one another sequentially, so that holes from the pixel electrode 171 and electrons from the common electrode 173 may be combined with each other in the emissive layer 172 to emit light.

The emissive layer 172 may be disposed on the pixel electrode 171 and the bank 190. The emissive layer 172 may include an organic material to emit light of a desired color (e.g., a certain or predetermined color). For example, the emissive layer 172 may include a hole transporting layer, an organic material layer, and an electron transporting layer.

The common electrode 173 may be disposed on the emissive layer 172. The common electrode 173 may be disposed to cover the emissive layer 172. The common electrode 173 may be a common layer formed commonly in the first emission area EA1, the second emission area EA2, the third emission area EA3, and the fourth emission area EA4. A capping layer may be formed on the common electrode 173.

In the top-emission organic light-emitting diode, the common electrode 173 may be formed of a transparent conductive material (TCP), such as ITO and IZO, that may transmit light, or a semi-transmissive conductive material, such as magnesium (Mg), silver (Ag), and an alloy of magnesium (Mg) and silver (Ag). When the common electrode 173 is formed of a semi-transmissive metal material, a light extraction efficiency may be increased by using microcavities.

An encapsulation layer TFEL may be disposed on the common electrode 173. The encapsulation layer TFEL may include at least one inorganic layer to prevent or substantially prevent permeation of oxygen or moisture into the emission material layer EML. In addition, the encapsulation layer TFEL may include at least one organic layer to protect the light-emitting element layer EML from foreign substances, such as dust. For example, the encapsulation layer TFEL may include a first inorganic encapsulation film TFE1, an organic encapsulation film TFE2, and a second inorganic encapsulation film TFE3.

The first inorganic encapsulation film TFE1 may be disposed on the common electrode 173. The organic encapsulation film TFE2 may be disposed on the first inorganic encapsulation film TFE1. The second inorganic encapsulation film TFE3 may be disposed on the organic encapsulation film TFE2. The first inorganic encapsulation film TFE1 and the second inorganic encapsulation film TFE3 may include (e.g., may be made up of) multiple layers in which one or more inorganic layers of a silicon nitride layer, a silicon oxynitride layer, a silicon oxide layer, a titanium oxide layer, and/or an aluminum oxide layer are alternately stacked on one another. The organic encapsulation film TFE2 may be an organic layer, such as an acryl resin, an epoxy resin, a phenolic resin, a polyamide resin, a polyimide resin, and/or the like.

The touch sensing unit TSU may be disposed on the encapsulation layer TFEL. The touch sensing unit TSU includes a first touch insulating layer TINS1, a bridge electrode BE, a second touch insulating layer TINS2, a driving electrode TE, and a sensing electrode RE.

The first touch insulating layer TINS1 is formed entirely on the touch sensing area TSA and the touch peripheral area TPA. The first touch insulating layer TINS1 may be formed of an inorganic layer, for example, such as a silicon nitride layer, a silicon oxynitride layer, a silicon oxide layer, a titanium oxide layer, or an aluminum oxide layer.

The bridge electrodes BE may be formed and disposed on the first touch insulating layer TINS1 of the touch sensing area TSA. The bridge electrode BE may include (e.g., may be made up of) a single layer or multiple layers of at least one of molybdenum (Mo), aluminum (Al), chromium (Cr), gold (Au), titanium (Ti), nickel (Ni), neodymium (Nd), copper (Cu), or a suitable alloy thereof.

During a process of forming the bridge electrodes BE, the plurality of first to $m^{th}$ sensing lines 1RLm and 2RLm may be formed and disposed in the touch peripheral area TPA with the same metal material and in the same patterning process as those of the bridge electrodes BE. The first to $m^{th}$ sensing lines 1RLm and 2RLm may be patterned in a shape having a spacing (e.g., a predetermined spacing) and a length (e.g., a predetermined length).

The second touch insulating layer TINS2 is formed on the entire surface of the first touch insulating layer TINS1, so that the second touch insulating layer TINS2 covers the connection electrodes BE of the touch sensing area TSA as well as the first to $m^{th}$ sensing lines 1RLm and 2RLm of the touch peripheral area TPA. The second touch insulating layer TINS2 may be formed of an inorganic layer, for example, such as a silicon nitride layer, a silicon oxynitride layer, a silicon oxide layer, a titanium oxide layer, or an aluminum oxide layer. As another example, the second touch insulating layer TINS2 may be formed of an organic layer, such as an acryl resin, an epoxy resin, a phenolic resin, a polyamide resin, and/or a polyimide resin.

The driving electrodes TE, the sensing electrodes RE, and the dummy patterns DE may be formed and disposed on the second touch insulating layer TINS2 of the touch sensing area TSA. The driving electrodes TE, the sensing electrodes RE, and dummy patterns DE may be formed of at least one of molybdenum (Mo), aluminum (Al), chromium (Cr), gold (Au), titanium (Ti), nickel (Ni), neodymium (Nd), copper (Cu), or a suitable alloy thereof.

During the process of forming the driving electrodes TE, the sensing electrodes RE, and the dummy patterns DE, first to $m^{th}$ touch driving signal lines TL1 to TLm may be formed and disposed in the touch peripheral area TPA with the same metal material as and via the same patterning process as those of the driving electrodes TE, the sensing electrodes RE, and the dummy patterns DE. The first to $m^{th}$ touch driving signal lines TL1 to TLm may be patterned in a shape with a suitable spacing (e.g., a predetermined spacing) and a suitable length (e.g., a predetermined length). The driving electrodes TE of each of the divided areas formed via the same patterning process may be electrically connected with the first to $m^{th}$ touch driving signal lines TL1 to TLm.

The driving electrodes TE and the sensing electrodes RE may overlap with the bridge electrodes BE in the third direction (e.g., the z-axis direction). The driving electrodes TE may be connected to the bridge electrodes BE through touch contact holes TCNT1 penetrating through the second touch insulating layer TINS2. The sensing electrodes RE may be electrically connected to the first to $m^{th}$ sensing lines 1RLm and 2RLm, respectively, through the touch contact holes TCNT1 penetrating the second touch insulating layer TINS2.

A color filter layer CFL may be formed on the touch sensing area TSA where the driving electrodes TE, the sensing electrodes RE and the dummy patterns DE are formed. The color filter layer CFL includes a plurality of first to third color filters CFL1, CFL2, and CFL3. The plurality of first to third color filters CFL1, CFL2, and CFL3 may be disposed in a plane shape on the second touch insulating layer TINS2 including the driving electrodes TE, the sensing electrodes RE, and the dummy patterns DE. For example, the color filter layer CFL may be formed on a third touch insulating layer TINS3, so that the color filter layer CFL overlaps with the first to fourth emission areas EA1 to EA4, or may be formed on the second touch insulating layer TINS2 including the driving electrodes TE and the sensing electrodes RE, so that the color filter layer CFL overlaps with the first to fourth emission areas EA1 to EA4.

The first color filter CFL1 may be disposed on the first emission area EA1 for emitting light of the first color. The second color filter CFL2 may be disposed on the second emission area EA2 for emitting light of the second color. The third color filter CFL3 may be disposed on the third emission area EA3 for emitting light of the third color. In addition, the second color filter CFL2 may be disposed on the fourth emission area EA4 that emits light of the second color.

The first to third color filters CFL1, CFL2, and CFL3 transmit light from the first to fourth emission areas EA1 to EA4, and may reduce a reflectance of light incident from the outside. The amount of external light may be reduced to approximately ⅓ after it passes through the first to third color filters CFL1, CFL2, and CFL3. Accordingly, some of the light passing through the first to third color filters CFL1, CFL2, and CFL3 may be extinguished.

As shown in FIG. 6, by forming the color filter layer CFL and the like on the touch sensing area TSA where the driving electrodes TE, the sensing electrodes RE, and the dummy patterns DE are formed without forming a separate protective layer and the like, a fabrication process for forming a protective layer and the like may be omitted. The fabrication process of the touch sensing unit TSU may be simplified by omitting the process of fabricating the protective layer.

In addition, a slimmer display panel 100 may be formed in which a cover glass or a top case are omitted. In other words, as the color filter layer CFL is formed without forming a separate protective layer on the touch sensing area TSA, the fabrication process for forming the cover glass, the top case, and the like on the display panel 100, including the touch sensing unit TSU, may be omitted.

Figure 7:
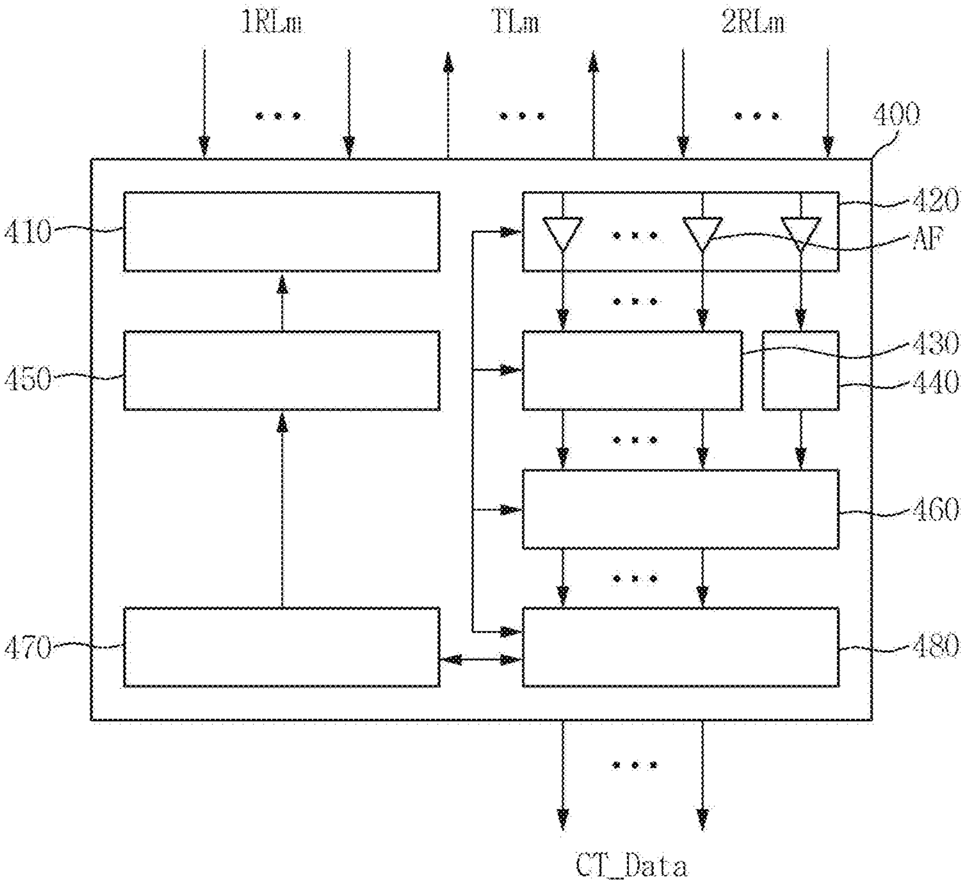
FIG. 7 is a block diagram showing the touch driver circuit shown in FIGS. 1 and 2.

FIG. 7 is a block diagram showing the touch driver circuit shown in FIGS. 1 and 2.

Referring to FIG. 7, the touch driver circuit 400 includes a driving signal output 410, a sensing circuit 420, an analog-to-digital converter 430, a current detector 440, a touch driving controller 450, a coordinate data generator 460, a divided-block setter 470, and a touch data output 480.

Under the control of the touch driving controller 450, the driving signal output 410 may concurrently (e.g., simultaneously or substantially simultaneously) supply touch driving signals to the driving electrodes TE disposed in different divided areas (e.g., in first and second divided areas TB1 and TBn) through the respective branching touch driving signal lines TL1 to TLm. For example, the touch driver circuit 400 may sequentially supply the touch driving signals to the branching touch driving signal lines TL1 to TLm.

The driving signal output 410 may select the branching touch driving signal lines TL1 to TLm based on results of the dividing of the first and second divided areas TB1 and TBn by the divided-block setter 470, and may supply the touch driving signals to the branching touch driving signal lines TL1 to TLm. The driving signal output 410 supplies the touch driving signals through the touch driving signal lines TL1 to TLm connected to the driving electrodes TE, respectively, and the touch driving signals are supplied to the driving electrodes TE either concurrently (e.g., simultaneously or substantially simultaneously) or sequentially.

The sensing circuit 420 either concurrently (e.g., simultaneously or substantially simultaneously) or sequentially receives the touch sensing signals of the sensing electrodes RE through a plurality of first to $m^{th}$ sensing lines 1RLm and 2RLm connected to the sensing electrodes RE of the different divided areas (e.g., the first and second divided areas TB1 and TBn).

The sensing circuit 420 senses the amount of changes in capacitance of each of the touch nodes TN using the touch sensing signals received from the first to $m^{th}$ sensing lines 1RLm and 2RLm. For example, the sensing circuit 420 may receive touch driving signals fed back from the first to $m^{th}$ sensing lines 1RLm and 2RLm as touch sensing signals of the driving electrodes TE. The sensing circuit 420 may use operational amplifiers AF for sensing the amount of changes in the capacitances of the touch nodes TN using the touch sensing signals. The operational amplifiers AF may be connected to the first to $m^{th}$ sensing lines 1RLm and 2RLm, respectively.

The analog-to-digital converter 430 samples the sensing signals amplified from the operational amplifiers AF of the sensing circuit 420 (e.g., the voltage level of the sensing signals) according to changes in the amount of charges at each of the touch nodes to sequentially convert them into touch data, which is digital data.

The current detector 440 detects the amount of current from test signals amplified by the operational amplifiers AF of the sensing circuit 420. The current detector 440 may detect the amount of current using a current detecting element, and may share the detected amount of current with the touch driving controller 450. The touch driving controller 450 may check a touch sensing operation and a touch sensing period of the touch sensing unit TSU in real time according to the results of the amount of detected current.

The coordinate data generator 460 compares changes in the size of the touch data sequentially input from the analog-to-digital converter 430 with the touch data input in the previous and subsequent periods and analyzes them, to detect whether or not a touch has been made. Then, the coordinate data generator 460 matches the sequentially input touch data with a layout map of the touch nodes to generate touch position coordinate data CT_Data.

The touch data output 480 stores the touch position coordinate data CT_Data input from the coordinate data generator 460 at least every frame, and supplies the touch position coordinate data CT_Data to the display driver circuit 200.

The divided-block setter 470 divides the touch sensing area TSA of the touch sensing unit TSU into a plurality of divided areas. The touch sensing area TSA may be divided in advance into a plurality of divided areas according to the area or the width of the touch sensing area TSA, the width in one direction, or the like. For example, the touch sensing area TSA may be divided in half according to the length or the width in the first direction (e.g., the x-axis direction), and accordingly, may be divided into first and second divided areas TB1 and TBn.

As described above, the touch driver circuit 400 supplies the touch driving signals to the driving electrodes TE that are disposed in each of the divided areas TB1 to TBn of the touch sensing area TSA during the same period, and then detects the coordinates of the touch position from each of the divided areas TB1 to TBn in the same period, thereby shortening the touch detection period. Accordingly, even though the size and the area of the touch electrodes are reduced, and the number of touch electrodes is increased, the touch position detection period may be maintained or shortened by concurrently (e.g., simultaneously or substantially simultaneously) driving the touch electrodes SE for each of the divided areas TB1 to RBn, and detecting the coordinates of the touch position. Additionally, it may be possible to detect the touch position coordinates for each of the divided areas TB1 to TBn in which the number of touch electrodes SE is increased, without increasing the number of touch driver circuit 400.

Figure 8:
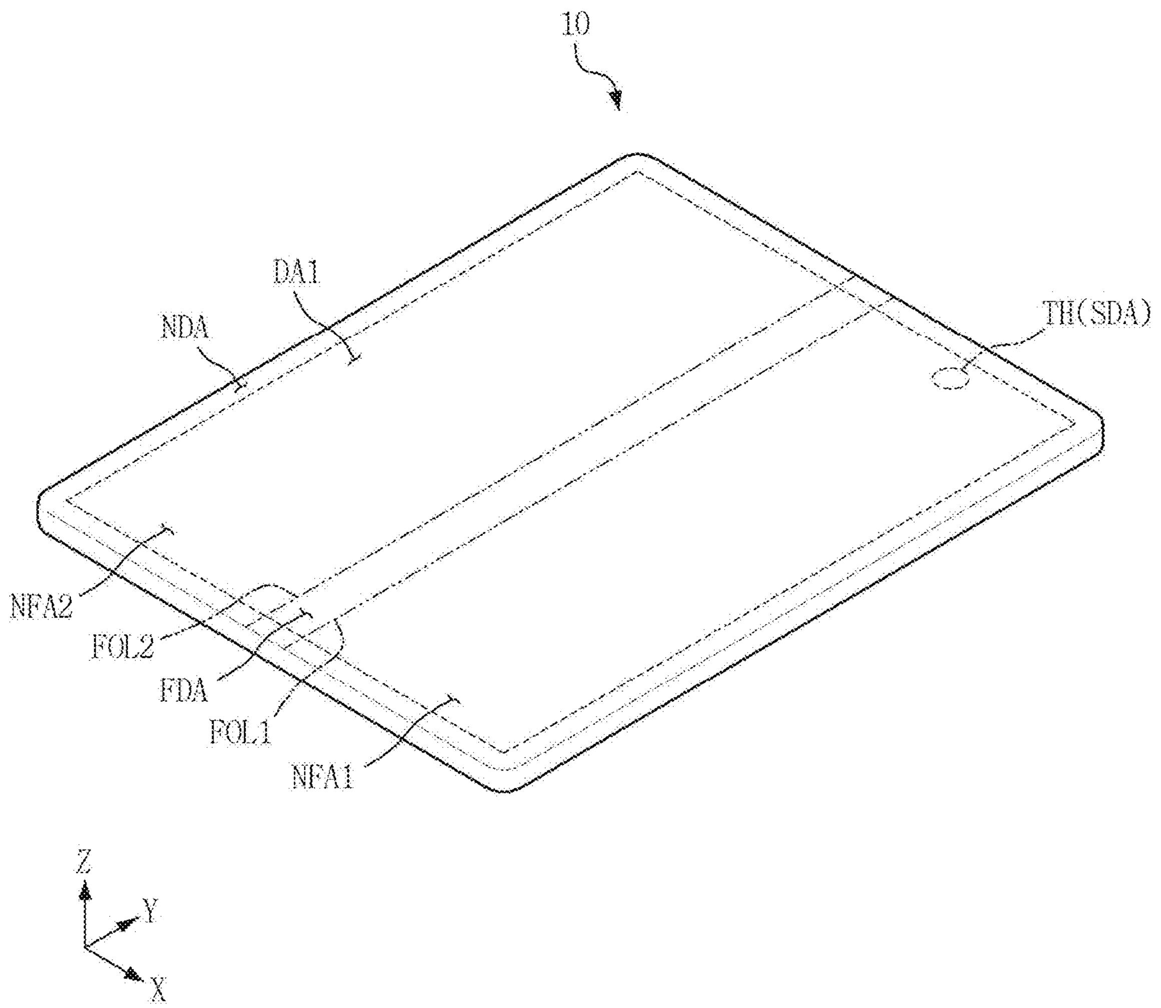
FIGS. 8 and 9 are perspective views showing a display device according to another embodiment of the present disclosure.
Figure 9:
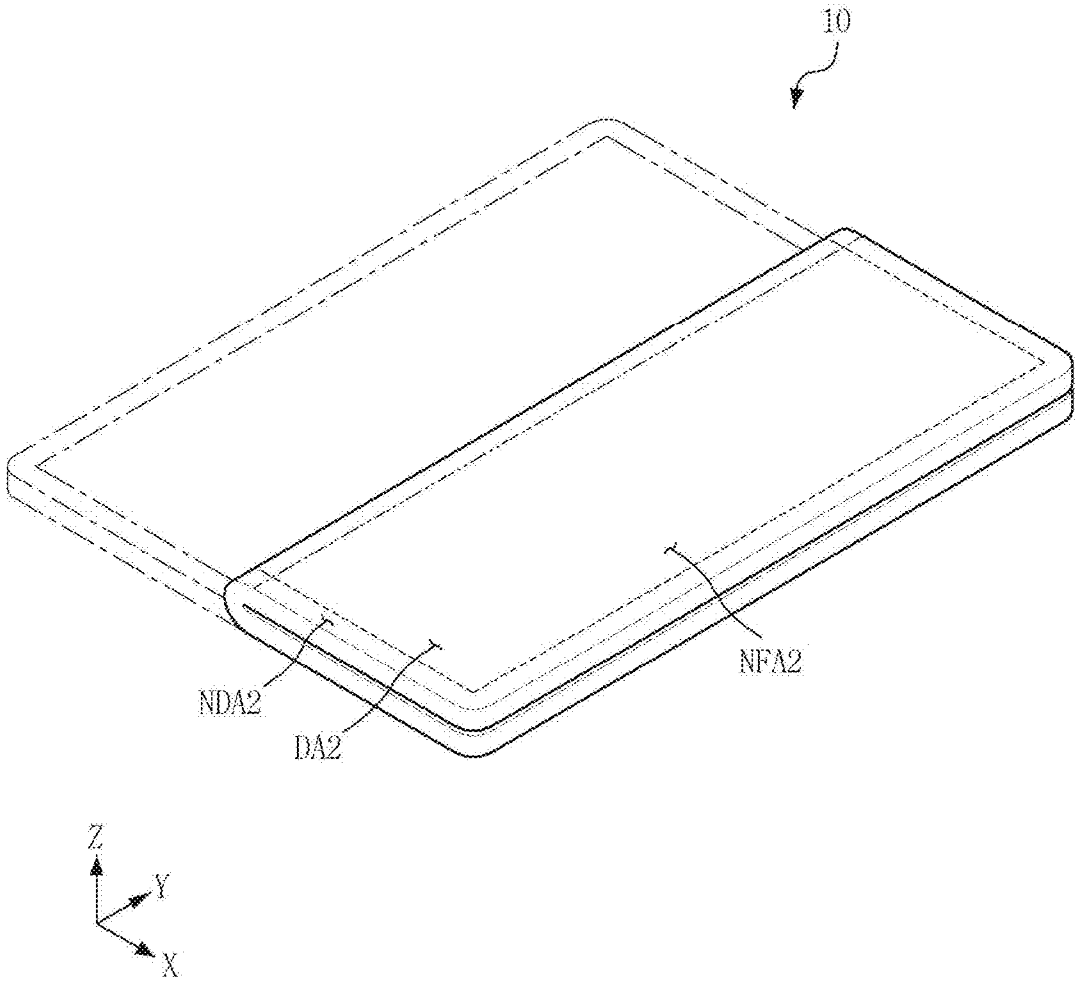

FIGS. 8 and 9 are perspective views showing a display device according to another embodiment of the present disclosure.

In FIGS. 8 and 9, a display device 10 that is a foldable display device that may be folded in the first direction (e.g., the x-axis direction) is shown. The display device 10 may remain folded, as well as may remain unfolded. The display device 10 may be folded inward (e.g., an in-folding manner), such that the front surface is located inside. When the display device 10 is bent or folded in the in-folding manner, a part of the front surface of the display device 10 may face another part of the front surface. As another example, the display device 10 may be folded outward (e.g., an out-folding manner), such that the front surface is located outside. When the display device 10 is bent or folded in the out-folding manner, a part of the rear surface of the display device 10 may face another part of the rear surface.

The first non-folding area NFA1 may be disposed on one side, for example, such as on the right side of the folding area FDA. The second non-folding area NFA2 may be disposed on the opposite side, for example, such as on the left side of the folding area FDA. The touch sensing unit TSU according to an embodiment of the present disclosure may be formed and disposed on each of the first non-folding area NFA1 and the second non-folding area NFA2.

The first folding line FOL1 and the second folding line FOL2 may extend in the second direction (e.g., the y-axis direction), and the display device 10 may be folded in the first direction (e.g., the x-axis direction). As a result, the length of the display device 10 in the first direction (e.g., the x-axis direction) may be reduced to about half, so that a user may carry the display device 10 more easily.

The direction in which the first folding line FOL1 and the second folding line FOL2 are extended is not limited to the second direction (e.g., the y-axis direction). For example, the first folding line FOL1 and the second folding line FOL2 may extend in the first direction (e.g., the x-axis direction), and the display device 10 may be folded in the second direction (e.g., the y-axis direction). In this case, the length of the display device 10 in the second direction (e.g., the y-axis direction) may be reduced to about half. As another example, the first folding line FOL1 and the second folding line FOL2 may extend in a diagonal direction of the display device 10 between the first direction (e.g., the x-axis direction) and the second direction (e.g., the y-axis direction). In this case, the display device 10 may be folded in a triangle shape.

When the first folding line FOL1 and the second folding line FOL2 are extended in the second direction (e.g., the y-axis direction), the length of the folding area FDA in the first direction (e.g., the x-axis direction) may be smaller than the length in the second direction (e.g., the y-axis direction). In addition, the length of the first non-folding area NFA1 in the first direction (e.g., the x-axis direction) may be larger than the length of the folding area FDA in the first direction (e.g., the x-axis direction). The length of the second non-folding area NFA2 in the first direction (e.g., the x-axis direction) may be larger than the length of the folding area FDA in the first direction (e.g., the x-axis direction).

The first display area DA1 may be disposed on the front side of the display device 10. The first display area DA1 may overlap with the folding area FDA, the first non-folding area NFA1, and the second non-folding area NFA2. Therefore, when the display device 10 is unfolded, images may be displayed on the front side of the folding area FDA, the first non-folding area NFA1, and the second non-folding area NFA2 of the display device 10.

The second display area DA2 may be disposed on the rear side of the display device 10. The second display area DA2 may overlap with the second non-folding area NFA2. Therefore, when the display device 10 is folded, images may be displayed on the front side of the second non-folding area NFA2 of the display device 10.

Although a through hole TH where a camera SDA or the like is formed may be located in the first non-folding area NFA1 as shown in FIGS. 8 and 9, the present disclosure is not limited thereto. The through hole TH and/or the camera SDA may be located in the second non-folding area NFA2 or the folding area FDA.

Figure 10:
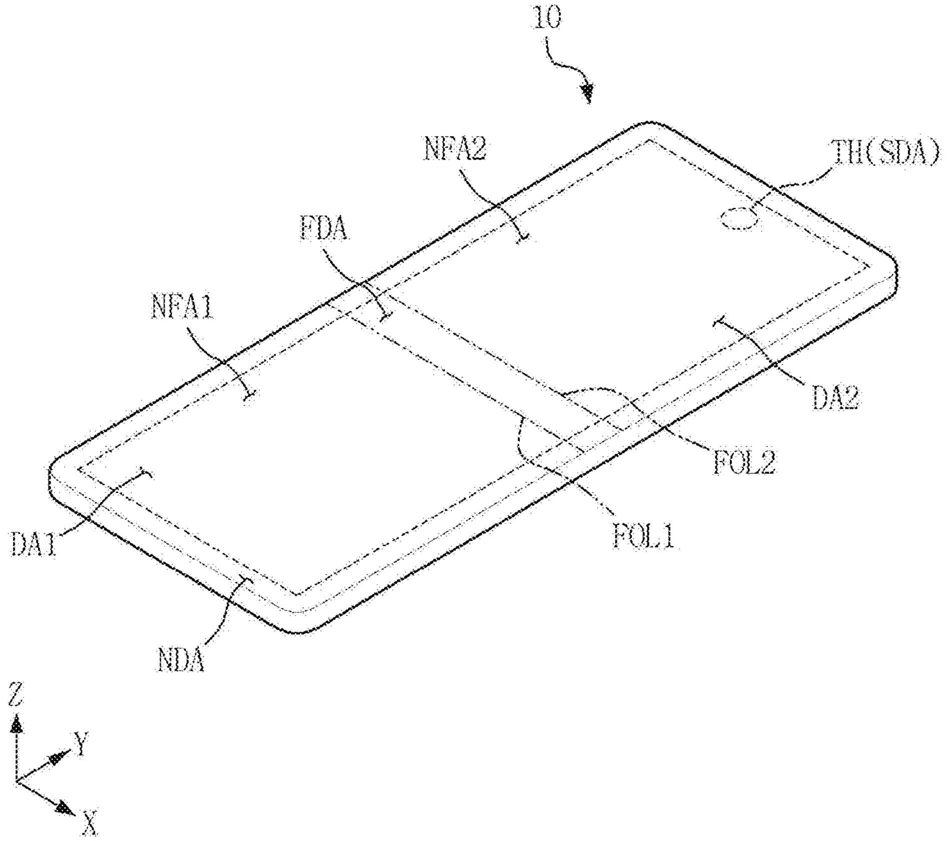
FIGS. 10 and 11 are perspective views showing a display device according to another embodiment of the present disclosure.
Figure 11:
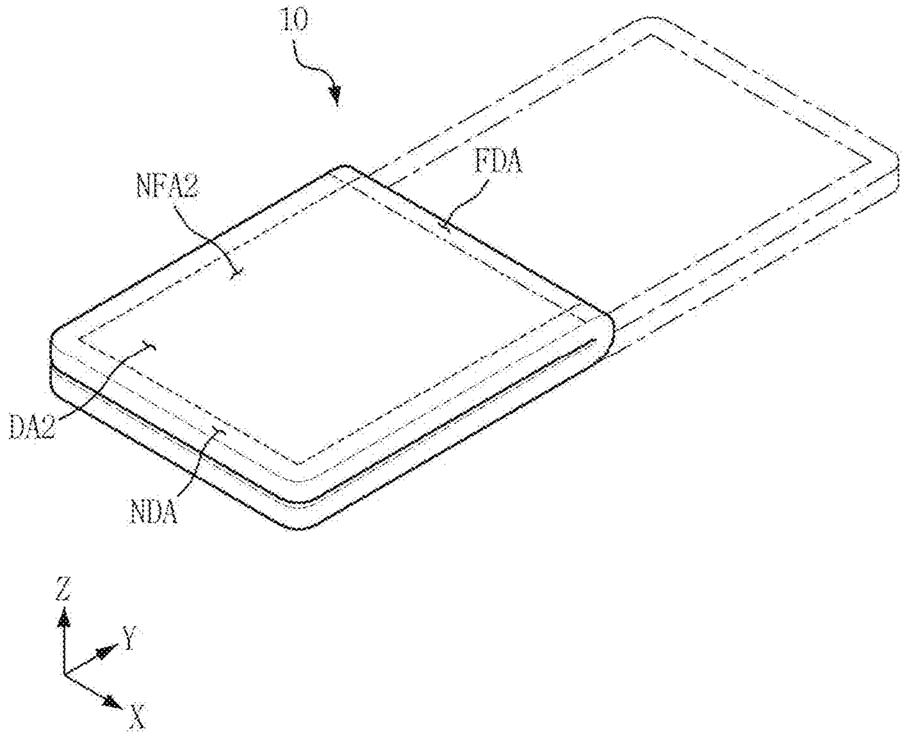

FIGS. 10 and 11 are perspective views showing a display device according to another embodiment of the present disclosure.

In FIGS. 10 and 11, a display device 10 may be a foldable display device that is folded in the second direction (e.g., the y-axis direction). The display device 10 may remain folded, as well as may remain unfolded. The display device 10 may be folded inward (e.g., an in-folding manner), such that the front surface is located inside. When the display device 10 is bent or folded in the in-folding manner, a part of the front surface of the display device 10 may face another part of the front surface. As another example, the display device 10 may be folded outward (e.g., an out-folding manner), such that the front surface is located outside. When the display device 10 is bent or folded in the out-folding manner, a part of the rear surface of the display device 10 may face another part of the rear surface.

The display device 10 may include a folding area FDA, a first non-folding area NFA1, and a second non-folding area NFA2. The display device 10 may be folded at the folding area FDA, while it may not be folded at the first non-folding area NFA1 and the second non-folding area NFA2. The first non-folding area NFA1 may be disposed on one side, for example, such as the lower side of the folding area FDA. The second non-folding area NFA2 may be disposed on another side, for example, such as the upper side of the folding area FDA.

The touch sensing unit TSU according to an embodiment of the present disclosure may be formed and disposed on each of the first non-folding area NFA1 and the second non-folding area NFA2.

The folding area FDA may be an area that is bent with a curvature (e.g., a predetermined curvature) over the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may extend in the first direction (e.g., the x-axis direction) as shown in FIGS. 10 and 11, and the display device 10 may be folded in the second direction (e.g., the y-axis direction). As a result, the length of the display device 10 in the second direction (e.g., the y-axis direction) may be reduced to about half, so that the display device 10 may be more easy to carry.

The direction in which the first folding line FOL1 and the second folding line FOL2 are extended is not limited to the first direction (e.g., the x-axis direction). For example, the first folding line FOL1 and the second folding line FOL2 may extend in the second direction (e.g., the y-axis direction), and the display device 10 may be folded in the first direction (e.g., the x-axis direction). In this case, the length of the display device 10 in the first direction (e.g., the x-axis direction) may be reduced to about half. As another example, the first folding line FOL1 and the second folding line FOL2 may extend in a diagonal direction of the display device 10 between the first direction (e.g., the x-axis direction) and the second direction (e.g., the y-axis direction). In this case, the display device 10 may be folded in a triangle shape.

When the first folding line FOL1 and the second folding line FOL2 are extended in the first direction (e.g., the x-axis direction) as shown in FIGS. 10 and 11, the length of the folding area FDA in the second direction (e.g., the y-axis direction) may be smaller than the length thereof in the first direction (e.g., the x-axis direction). In addition, the length of the first non-folding area NFA1 in the second direction (e.g., the y-axis direction) may be larger than the length of the folding area FDA in the second direction (e.g., the y-axis direction). The length of the second non-folding area NFA2 in the second direction (e.g., the y-axis direction) may be larger than the length of the folding area FDA in the second direction (e.g., the y-axis direction).

The first display area DA1 may be disposed on the front side of the display device 10. The first display area DA1 may overlap with the folding area FDA, the first non-folding area NFA1, and the second non-folding area NFA2. Therefore, when the display device 10 is unfolded, images may be displayed on the front side of the folding area FDA, the first non-folding area NFA1, and the second non-folding area NFA2 of the display device 10.

The second display area DA2 may be disposed on the rear side of the display device 10. The second display area DA2 may overlap with the second non-folding area NFA2. Therefore, when the display device 10 is folded, images may be displayed on the front side of the second non-folding area NFA2 of the display device 10.

Although a through hole TH where the camera SDA or the like is disposed may be located in the second non-folding area NFA2 as shown in FIGS. 10 and 11, the present disclosure is not limited thereto. The through hole TH may be located in the first non-folding area NFA1 or the folding area FDA.

The electronic or electric devices and/or any other relevant devices or components according to embodiments of the present disclosure described herein (e.g., the touch driver circuit and its components) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A touch detection module comprising:

a touch sensing unit comprising:

touch electrodes in a touch sensing area, the touch sensing area being divided into a plurality of divided areas along a first direction; and touch driving signal lines and touch sensing signal lines in a touch peripheral area; and a touch driver circuit configured to:

concurrently supply touch driving signals to the touch electrodes extending in a second direction crossing the first direction and located in each of the divided areas through the touch driving signal lines; and detect touch sensing signals of the touch electrodes from each of the divided areas through the touch sensing signal lines, wherein the touch driver circuit is configured to concurrently detect the touch sensing signals from the divided areas, and measure an amount of change in a capacitance of the touch electrodes, wherein each of the touch driving signal lines is connected to ends of at least two of the touch electrodes extending in the second direction, the ends of the at least two of the touch electrodes facing a same side of the touch sensing unit as each other, and each of the at least two of the touch electrodes being located in a different one of the divided areas, and wherein the touch driving signal lines extend between touch sensing signal lines connected to the touch electrodes in one of the divided areas and touch sensing signal lines connected to the touch electrodes in another one of the divided areas from among the touch sensing signal lines.

2. The touch detection module of claim 1, wherein the touch electrodes comprise:

a plurality of driving electrodes spaced from one another along the first direction, and extending in the second direction crossing the first direction to be parallel with each other; and a plurality of sensing electrodes spaced from one another along the second direction, and extending in the first direction to be parallel with each other, and wherein crossings between the plurality of driving electrodes and the plurality of sensing electrodes define touch nodes.

3. The touch detection module of claim 2, wherein each of the touch driving signal lines comprises branches in a number equal to a number of the plurality of divided areas, branching ends are connected to corresponding ones of the driving electrodes of the divided areas, and an opposite end is electrically connected to the touch driver circuit through a touch pad.

4. The touch detection module of claim 2, wherein the touch sensing area is divided in half according to a length or a width in the first direction into first and second divided areas, and wherein:

each of the touch driving signal lines comprises branches associated with the first and second divided areas, respectively;

branching ends are connected to corresponding ones of the driving electrodes of the first and second divided areas; and an opposite end is electrically connected to the touch driver circuit through a touch pad.

5. The touch detection module of claim 3, wherein the driving electrodes of each of the divided areas are electrically connected to the branches of the touch driving signal lines in a same number as that of the divided areas, and are connected to touch pads and the touch driver circuit through the branches of the touch driving signal lines.

6. The touch detection module of claim 2, wherein the touch sensing signal lines comprises a plurality of first to $m^{th}$ sensing lines associated with each of the plurality of divided areas, each of the plurality of first to $m^{th}$ sensing lines of each of the divided areas being connected to a corresponding one of the sensing electrodes of a corresponding one of the divided areas, and wherein the sensing electrodes for each of the divided areas are electrically connected to touch pads and the touch driver circuit through corresponding ones of the plurality of first to $m^{th}$ sensing lines, where m is an integer.

7. The touch detection module of claim 2, wherein:

each of the touch driving signal lines comprises branches in a number equal to a number of the plurality of divided areas;

branching ends are connected to corresponding ones of the driving electrodes of the divided areas; and an opposite end is electrically connected to the touch driver circuit through a touch pad, and wherein the touch sensing signal lines are connected with the sensing electrodes for each of the plurality of divided areas, respectively.

8. The touch detection module of claim 7, wherein the touch driver circuit is configured to:

concurrently supply the touch driving signals to the driving electrodes located in each of the divided areas through the branches of the touch driving signal lines; and receive the touch sensing signals through the touch sensing signal lines connected with the sensing electrodes for each of the plurality of divided areas.

9. The touch detection module of claim 8, wherein the touch driver circuit is configured to:

sequentially select the touch driving signal lines comprising the branches to sequentially supply the touch driving signals to the driving electrodes located in each of the divided areas; and sequentially receive the touch sensing signals through the touch sensing signal lines.

10. A display device comprising:

a display panel comprising a display area comprising a plurality of pixels; and a touch detection module located on a front of the display panel to detect a user's touch, wherein the touch detection module comprises:

a touch sensing unit comprising:

touch electrodes in a touch sensing area, the touch sensing area being divided into a plurality of divided areas along a first direction; and touch driving signal lines and touch sensing signal lines in a touch peripheral area; and a touch driver circuit configured to:

concurrently supply touch driving signals to the touch electrodes extending in a second direction crossing the first direction in each of the divided areas through the touch driving signal lines; and detect touch sensing signals of the touch electrodes from each of the divided areas through the touch sensing signal lines, wherein the touch driver circuit is configured to concurrently detect the touch sensing signals from the divided areas, and measure an amount of change in a capacitance of the touch electrodes, wherein each of the touch driving signal lines is connected to ends of at least two of the touch electrodes extending in the second direction, the ends of the at least two of the touch electrodes facing a same side of the touch sensing unit as each other, and each of the at least two of the touch electrodes being located in a different one of the divided areas, and wherein the touch driving signal lines extend between touch sensing signal lines connected to the touch electrodes in one of the divided areas and touch sensing signal lines connected to the touch electrodes in another one of the divided areas from among the touch sensing signal lines.

11. The display device of claim 10, wherein the touch electrodes comprise:

a plurality of driving electrodes spaced from one another in the first direction, and extending in the second direction perpendicular to the first direction to be parallel with each other; and a plurality of sensing electrodes spaced from one another in the second direction, and extending in the first direction to be parallel with each other, and wherein crossings of the plurality of driving electrodes and the plurality of sensing electrodes define touch nodes.

12. The display device of claim 11, wherein each of the touch driving signal lines branches off in a number equal to a number of the plurality of divided areas, such that branching ends are connected to corresponding ones of the driving electrodes of the divided areas, and an opposite end is electrically connected to the touch driver circuit through a touch pad.

13. The display device of claim 11, wherein the touch sensing area is divided in half according to a length or a width in the first direction into first and second divided areas, and wherein each of the touch driving signal lines branches off to be associated with the first and second divided areas, respectively, such that branching ends are connected to corresponding ones of the driving electrodes of the first and second divided areas, and an opposite end is electrically connected to the touch driver circuit through a touch pad.

14. The display device of claim 11, wherein the touch sensing signal lines comprises a plurality of first to $m^{th}$ sensing lines associated with the plurality of divided areas, respectively, each of the plurality of first to $m^{th}$ sensing lines being connected with a respective one of the sensing electrodes located for each of the divided areas, and wherein the sensing electrodes for each of the divided areas are electrically connected to touch pads and the touch driver circuit through corresponding ones of the plurality of first to $m^{th}$ sensing lines, where m is an integer.

15. The display device of claim 11, wherein each of the touch driving signal lines branches off in a number equal to a number of the plurality of divided areas, such that branching ends are connected to corresponding ones of the driving electrodes of the divided areas, and an opposite end is electrically connected to the touch driver circuit through a touch pad, and wherein the touch sensing signal lines are connected with the sensing electrodes located for each of the plurality of divided areas, respectively.

16. The display device of claim 15, wherein the touch driver circuit is configured to:

concurrently supply the touch driving signals to the driving electrodes in each of the divided areas through the branching touch driving signal lines; and receive the touch sensing signals through the touch sensing signal lines connected with the sensing electrodes for each of the plurality of divided areas.

17. The display device of claim 16, wherein the touch driver circuit is configured to:

sequentially select the branching touch driving signal lines to sequentially supply the touch driving signals to the driving electrodes in each of the divided areas; and sequentially receive the touch sensing signals through the touch sensing signal lines.

18. The touch detection module of claim 1, wherein each of the touch driving signal lines and the touch sensing signal lines comprises a portion extending in the second direction, and wherein the portion extending in the second direction of the touch driving signal lines is located in the first direction between the portion extending in the second direction of the touch sensing signal lines connected to the touch electrodes in the one of the divided areas and the portion extending in the second direction of the touch sensing signal lines connected to the touch electrodes in the another one of the divided areas.

* * * * *